(12) United States Patent
Choi

(10) Patent No.: US 10,222,957 B2
(45) Date of Patent: Mar. 5, 2019

(54) KEYBOARD WITH A SUGGESTED SEARCH QUERY REGION

(71) Applicant: Google Inc., Mountain View, CA (US)

(72) Inventor: Min-sang Choi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 380 days.

(21) Appl. No.: 15/134,029

(22) Filed: Apr. 20, 2016

(65) Prior Publication Data

US 2017/0308273 A1    Oct. 26, 2017

(51) Int. Cl.
| | |
|---|---|
| *G06F 3/0481* | (2013.01) |
| *G06F 3/0484* | (2013.01) |
| *G06F 3/0485* | (2013.01) |
| *G06F 3/0488* | (2013.01) |
| *G06F 17/22* | (2006.01) |
| *G06F 17/30* | (2006.01) |
| *G06F 17/27* | (2006.01) |
| *G06F 3/023* | (2006.01) |
| *G06F 17/21* | (2006.01) |

(52) U.S. Cl.
CPC ........ *G06F 3/04842* (2013.01); *G06F 3/0237* (2013.01); *G06F 3/0485* (2013.01); *G06F 3/04886* (2013.01); *G06F 17/2235* (2013.01); *G06F 17/276* (2013.01); *G06F 17/3097* (2013.01); *G06F 17/30554* (2013.01); *G06F 17/30643* (2013.01); *G06F 17/211* (2013.01)

(58) Field of Classification Search
CPC .. G06F 3/0482; G06F 3/0485; G06F 3/04886; G06F 17/2235; G06F 17/30643; G06F 17/30554; G06F 17/3097; G06F 17/276
See application file for complete search history.

(56) References Cited

U.S. PATENT DOCUMENTS

| | | |
|---|---|---|
| 6,104,397 A | 8/2000 | Ryan et al. |
| 8,370,143 B1 | 2/2013 | Coker |
| 8,484,573 B1 | 7/2013 | Zhai et al. |
| 8,650,210 B1 | 2/2014 | Cheng et al. |

(Continued)

FOREIGN PATENT DOCUMENTS

EP    2940605 A1    11/2015

OTHER PUBLICATIONS

U.S. Appl. No. 15/332,409, by Muhammad Mohsin et al., filed Oct. 24, 2016.

(Continued)

*Primary Examiner* — Rashawn N Tillery
(74) *Attorney, Agent, or Firm* — Shumaker & Sieffert, P.A.

(57) ABSTRACT

A computing device is described that includes a presence-sensitive display component, at least one processor, and a memory. The memory stores instructions that when executed cause the at least one processor to output, for display, a graphical keyboard comprising a plurality of keys and a search element, and determine, based at least in part on a selection of one or more keys from the plurality of keys, a query suggestion. The instructions, when executed, further cause the at least one processor to receive an indication of input selecting the search element, and responsive to receiving the indication of input, output, for display, an updated graphical keyboard that includes a selectable link associated with the query suggestion.

15 Claims, 18 Drawing Sheets

(56) References Cited

U.S. PATENT DOCUMENTS

| | | | |
|---|---|---|---|
| 8,706,750 | B2 | 4/2014 | Hansson et al. |
| 8,745,018 | B1* | 6/2014 | Singleton .......... G06F 17/30899 |
| | | | 707/705 |
| 9,043,196 | B1 | 5/2015 | Leydon et al. |
| 9,086,775 | B1 | 7/2015 | Tse et al. |
| 9,720,955 | B1 | 8/2017 | Cao et al. |
| 2005/0234883 | A1 | 10/2005 | Szeto et al. |
| 2006/0048076 | A1 | 3/2006 | Vronay et al. |
| 2006/0294189 | A1 | 12/2006 | Natarajan et al. |
| 2007/0088686 | A1 | 4/2007 | Hurst-Hiller et al. |
| 2007/0130276 | A1 | 6/2007 | Zhang et al. |
| 2007/0300177 | A1 | 12/2007 | Karas et al. |
| 2008/0201434 | A1 | 8/2008 | Holmes et al. |
| 2008/0244446 | A1 | 10/2008 | LeFevre et al. |
| 2008/0249764 | A1 | 10/2008 | Huang et al. |
| 2010/0277424 | A1 | 11/2010 | Chang et al. |
| 2010/0325100 | A1 | 12/2010 | Forstall et al. |
| 2011/0087990 | A1 | 4/2011 | Ng et al. |
| 2011/0112824 | A1 | 5/2011 | Sayers et al. |
| 2011/0191321 | A1 | 8/2011 | Gade et al. |
| 2011/0191364 | A1* | 8/2011 | LeBeau ............. G06F 17/30672 |
| | | | 707/767 |
| 2011/0201387 | A1 | 8/2011 | Paek et al. |
| 2011/0221678 | A1 | 9/2011 | Davydov et al. |
| 2012/0036469 | A1 | 2/2012 | Suraqui |
| 2012/0102549 | A1 | 4/2012 | Mazzaferri et al. |
| 2012/0124071 | A1 | 5/2012 | Gebhard et al. |
| 2012/0124519 | A1 | 5/2012 | Uphoff et al. |
| 2012/0127083 | A1 | 5/2012 | Kushler et al. |
| 2012/0146955 | A1 | 6/2012 | Martin-Cocher et al. |
| 2012/0254227 | A1 | 10/2012 | Heck et al. |
| 2013/0120267 | A1 | 5/2013 | Pasquero et al. |
| 2013/0246913 | A1 | 9/2013 | McCormack et al. |
| 2013/0285913 | A1 | 10/2013 | Griffin et al. |
| 2013/0297317 | A1 | 11/2013 | Lee et al. |
| 2013/0325844 | A1 | 12/2013 | Plaisant |
| 2014/0002363 | A1 | 1/2014 | Griffin et al. |
| 2014/0052946 | A1 | 2/2014 | Kimmel |
| 2014/0115070 | A1 | 4/2014 | Virtanen et al. |
| 2014/0172814 | A1* | 6/2014 | Yuen .................. G06F 17/3064 |
| | | | 707/706 |
| 2014/0201676 | A1 | 7/2014 | Du et al. |
| 2014/0223372 | A1 | 8/2014 | Dostie et al. |
| 2014/0229847 | A1 | 8/2014 | Park |
| 2014/0282136 | A1* | 9/2014 | Marantz ............. G06F 17/3097 |
| | | | 715/764 |
| 2014/0282203 | A1 | 9/2014 | Pasquero et al. |
| 2014/0324434 | A1 | 10/2014 | Vozila et al. |
| 2014/0330769 | A1 | 11/2014 | Nguyen et al. |
| 2014/0358940 | A1 | 12/2014 | Gupta et al. |
| 2015/0006505 | A1* | 1/2015 | Plakhov ............ G06F 17/30867 |
| | | | 707/710 |
| 2015/0100537 | A1 | 4/2015 | Grieves et al. |
| 2015/0113435 | A1 | 4/2015 | Phillips |
| 2015/0120287 | A1 | 4/2015 | Stern et al. |
| 2015/0121286 | A1 | 4/2015 | Kim et al. |
| 2015/0201065 | A1 | 7/2015 | Shim et al. |
| 2015/0222586 | A1 | 8/2015 | Ebersman et al. |
| 2015/0242086 | A1 | 8/2015 | Mindlin |
| 2015/0317316 | A1 | 11/2015 | Ghanekar et al. |
| 2015/0331605 | A1 | 11/2015 | Park et al. |
| 2015/0370434 | A1 | 12/2015 | Kritt et al. |
| 2016/0006856 | A1* | 1/2016 | Bruno ............... H04M 1/72547 |
| | | | 715/809 |
| 2016/0034977 | A1 | 2/2016 | Bhaowal et al. |
| 2016/0085773 | A1 | 3/2016 | Chang et al. |
| 2016/0124926 | A1 | 5/2016 | Fallah |
| 2016/0224524 | A1 | 8/2016 | Kay et al. |
| 2016/0330150 | A1* | 11/2016 | Joe ........................ H04L 51/046 |
| 2016/0334988 | A1 | 11/2016 | Kim et al. |
| 2017/0102870 | A1 | 4/2017 | Won |
| 2017/0102871 | A1 | 4/2017 | Won |
| 2017/0308273 | A1 | 10/2017 | Choi |
| 2017/0308291 | A1 | 10/2017 | Luipold |
| 2017/0308292 | A1 | 10/2017 | Choi |
| 2017/0308586 | A1 | 10/2017 | Mohsin et al. |
| 2017/0308587 | A1 | 10/2017 | Nagel et al. |
| 2017/0310616 | A1 | 10/2017 | Cao et al. |

OTHER PUBLICATIONS

Mcalone, "Slash is the best iPhone Keyboard—Business Insider," retrieved from http://www.businessinsider.com/slash-is-the-best-iphone-keyboard-2015-9, Sep. 22, 2015, 26 pp.
U.S. Appl. No. 15/289,661, by Jing Cao, filed Oct. 10, 2016.
U.S. Appl. No. 15/332,513, by Heather Luipold, filed Oct. 24, 2016.
Whitwam, "Microsoft Hub Keyboard Comes to Android With All Things Microsoft in Tow," retrieved from http://www.androidpolice.com/2016/02/23/microsoft-hub-keyboard-comes-to-android-with-all-things-microsoft-in-tow/, Feb. 23, 2016, 5 pp.
International Search Report and Written Opinion of International Application No. PCT/US2016/069267, dated Apr. 3, 2017, 15 pp.
Office Action from U.S. Appl. No. 15/299,027, dated Jan. 27, 2017, 18 pp.
Response to Office Action dated Jan. 27, 2017, from U.S. Appl. No. 15/299,027, filed Apr. 18, 2017, 14 pp.
Response to Written Opinion dated Apr. 3, 2017, from International Application No. PCT/US2016/069267, dated Nov. 30, 2017, 11 pp.
Russell-Rose et al., "How to provide autocomplete and autosuggest on the same search box at the same time," StackExchange, accessed from http://ux.stackexchange.com/questions/40104/how-to-provide-autocomplete-and-autosuggest-on-the-same-search-box-at-the-same-t, May 25, 2013, 2 pp.
StackExchange (2013), "How to provide autocomplete and autosuggest on the same search box at the same time", retrieved from: http://ux.stackexchange.com/questions/40104/how-to-provide-autocomplete-and-autosuggest-on-the-same-search-box-at-the-same-t accessed on Aug. 30, 2017, 2 pp.
U.S. Appl. No. 15/383,753 by Alexa Greenberg et al., filed Dec. 19, 2016.
Final Office Action from U.S. Appl. No. 15/299,027, dated Aug. 28, 2017, 23 pp.
Response to Office Action dated Aug. 28, 2017, from U.S. Appl. No. 15/229,027, filed Oct. 30, 2017, 13 pp.
Advisory Action from U.S. Appl. No. 15/229,027, dated Dec. 7, 2017, 6 pp.
Notice of Allowance from U.S. Appl. No. 15/229,027, dated Jan. 10, 2018, 8 pp.
Chansanchai, "Hub Keyboard app from Microsoft Garage makes it easy to multitask from one mobile screen", retrieved from the Internet: <https://blogs.microsoft.com/firehose/2016/02/23/hub-keyboard-app-from-microsoft-garage-makes-it-easy-to-multitask-from-one-mobile-screen/#sm.0001ekq05s8cid6jpo52ovcbjyjie>, Feb. 23, 2016, 6 pp.
U.S. Appl. No. 15/133,291, by Jing Cao, filed Apr. 20, 2016.
U.S. Appl. No. 15/134,319, by Heather Luipold, filed Apr. 20, 2016.
U.S. Appl. No. 15/134,243, by Muhammad Mohsin, filed Apr. 20, 2016.
U.S. Appl. No. 15/134,323, by Jens Nagel, filed Apr. 20, 2016.
U.S. Appl. No. 15/246,091, by Nicholas Chi-Yuen Kong, filed Aug. 24, 2016.
U.S. Appl. No. 15/299,027, by Ming-sang Choi, filed Oct. 20, 2016.
Emura et al., "Facebook Recommendation based on Emotion, Communication and Motion Type Estimation in Microblogs," and Translation. Journal of Natural Language Processing vol. 19. No. 5, Dec. 2012, 52 pp.
Second Written Opinion of International Application No. PCT/US2016/069267, dated Mar. 22, 2018, 9 pp.
International Preliminary Report on Patentability from International Application No. PCT/US2016/069267, dated Jun. 21, 2018, 18 pp.

* cited by examiner

KEYBOARD WITH A SUGGESTED SEARCH QUERY REGION

BACKGROUND

Despite being able to simultaneously execute several applications, some mobile computing devices can only present a graphical user interface (GUI) of a single application at a time. To interact with multiple applications at once, a user of a mobile computing device may have to switch between different application GUIs. For example, a user of a mobile computing device may have to cease entering text in a messaging application and provide input to cause the device to toggle to a search application to search for a particular piece of information to use when composing a message or otherwise entering text. Providing several inputs required by some computing devices to perform various tasks can be tedious, repetitive, and time consuming.

SUMMARY

In one example, a method includes outputting, by a mobile computing device, for display, a graphical keyboard comprising a plurality of keys and a search element, determining, based at least in part on a selection of one or more keys from the plurality of keys, a query suggestion. The method further includes receiving, by the mobile computing device, an indication of input selecting the search element, and responsive to receiving the indication of input, outputting, by the mobile computing device, for display, an updated graphical keyboard that includes a selectable link associated with the query suggestion.

In another example, a mobile device comprises a presence-sensitive display component, at least one processor, and a memory that stores instructions that when executed cause the at least one processor to: output, for display, a graphical keyboard comprising a plurality of keys and a search element, determine, based at least in part on a selection of one or more keys from the plurality of keys, a query suggestion, receive an indication of input selecting the search element, and responsive to receiving the indication of input, output, for display, an updated graphical keyboard that includes a selectable link associated with the query suggestion.

In another example, a computer-readable storage medium comprises instructions that, when executed, cause at least one processor of a computing device to: output, for display, an application graphical user interface comprising an edit region, a plurality of keys, and a search element, determine, based at least in part on a selection of one or more keys from the plurality of keys, a query suggestion, receive an indication of input selecting the search element, and responsive to receiving the indication of input, output, for display, an updated application graphical user interface that includes a selectable link associated with the query suggestion, wherein the selectable link is positioned between the edit region and the plurality of keys.

The details of one or more examples are set forth in the accompanying drawings and the description below. Other features, objects, and advantages of the disclosure will be apparent from the description and drawings, and from the claims.

DETAILED DESCRIPTION

Figure 1:
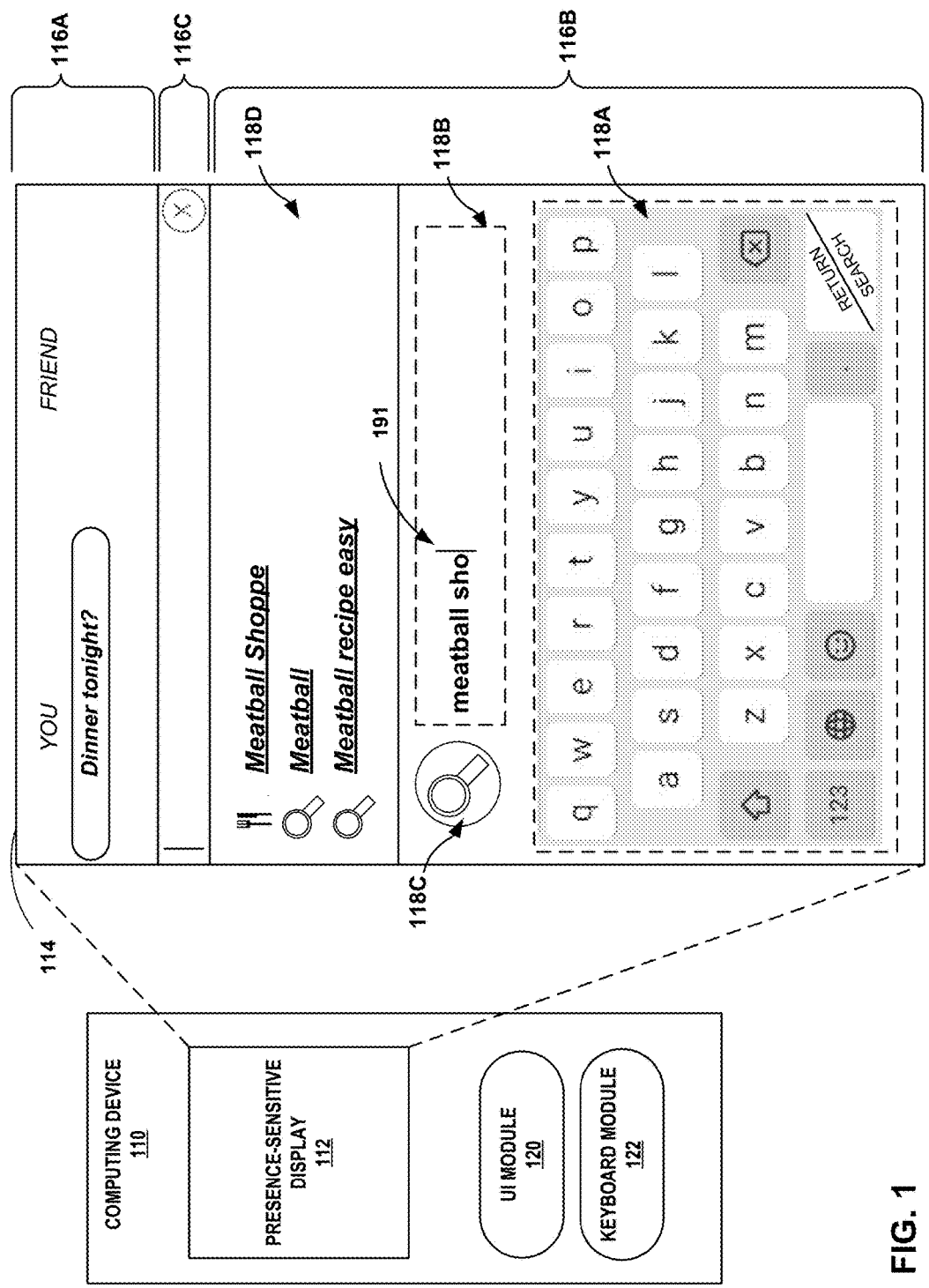
FIG. 1 is a conceptual diagram illustrating an example computing device that is configured to present a graphical keyboard with integrated search features, in accordance with one or more aspects of the present disclosure.

In general, this disclosure is directed to techniques that include enabling a computing device to display suggested search queries near the keys of a graphical keyboard while a user provides input at the keys of the graphical keyboard. For example, the computing device may output a graphical user interface (GUI) that includes a graphical keyboard. The graphical keyboard may suggest a search query, for example, based on text determined from user input as the user interacts with the graphical keyboard. In some examples, in addition to analyzing text, the graphical keyboard may generate suggested queries by analyzing other information such as the user's current or recent tasks, context, or prior interaction with the graphical keyboard. The suggested queries may therefore be relevant to the user's current or recent tasks in addition to the text inferred from user input, and may be updated in response to further typing or other input or actions detected by the computing device.

The graphical keyboard may display the suggested queries within the graphical keyboard, and in some examples, near a particular text field or other location of the graphical keyboard that has a current input focus. For example, the graphical keyboard may display a suggested query between the graphical keys and the edit region at which the user is currently typing. This arrangement may make it easier for the user to stay on task and easily view, and provide additional input to select suggested queries. In situations where the GUI has more than one text field that could have input focus, the graphical keyboard may display suggested queries above the particular text field that has the input focus, and below the other text field(s). Visual space created between the text fields in such an arrangement may reduce user confusion as to which text field has input priority. If the graphical keyboard detects a user selection of a suggested query, the graphical keyboard may execute a search based on a suggested query and display search results within the graphical keyboard, in some examples, replacing some or all keys within the graphical keyboard with search results. Such a graphical keyboard may allow a user to view suggested queries and obtain search results based on suggested queries without, in some cases, causing the user to lose focus, switch tasks, or switch between application user interfaces.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

FIG. 1 is a conceptual diagram illustrating an example computing device 110 that is configured to present a graphical keyboard with integrated search features, in accordance with one or more aspects of the present disclosure. Computing device 110 may represent a mobile device, such as a smart phone, a tablet computer, a laptop computer, computerized watch, or any other types of wearable and non-wearable, mobile or non-mobile computing devices that may output a graphical keyboard for display.

Computing device 110 includes a presence-sensitive display (PSD) 112, user interface (UI) module 120 and keyboard module 122. Modules 120 and 122 may perform operations described using software, hardware, firmware, or a mixture of hardware, software, and firmware residing in and/or executing at computing device 110. One or more processors of computing device 110 may execute instructions that are stored at a memory or other non-transitory storage medium of computing device 110 to perform the operations of modules 120 and 122. Computing device 110 may execute modules 120 and 122 as virtual machines executing on underlying hardware. Modules 120 and 122 may execute as one or more services of an operating system or computing platform. Modules 120 and 122 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may detect input (e.g., touch and non-touch input) from a user of respective computing device 110. PSD 112 may detect indications of input by detecting one or more gestures from a user (e.g., the user touching, pointing, and/or swiping at or near one or more locations of PSD 112 with a finger or a stylus pen). PSD 112 may output information to a user in the form of a user interface (e.g., user interface 114), which may be associated with functionality provided by computing device 110. Such user interfaces may be associated with computing platforms, operating systems, applications, and/or services executing at or accessible from computing device 110 (e.g., electronic message applications, chat applications, Internet browser applications, mobile or desktop operating systems, social media applications, electronic games, and other types of applications). For example, PSD 112 may present user interface 114 which, as shown in FIG. 1, is a graphical user interface of a chat application executing at computing device 110 and includes various graphical elements displayed at various locations of PSD 112.

As shown in FIG. 1, user interface 114 is a chat user interface. However, user interface 114 may be any graphical user interface which includes (or accesses the services of) a graphical keyboard with integrated search features. User interface 114 includes output region 116A, graphical keyboard 116B, and edit region 116C. A user of computing device 110 may provide input at graphical keyboard 116B to produce textual characters within edit region 116C that form the content of the electronic messages displayed within output region 116A. The messages displayed within output region 116A form a chat conversation between a user of computing device 110 and a user of a different computing device.

In some examples, region 116A is a user interface for a first application that is separate and distinct from a keyboard application that provides the graphical keyboard 116B. In such examples, the first application utilizes the services of the keyboard application for certain input and output functions, including text and symbol entry, text and symbol display, text and symbol entry editing, attachment selection, process invocation (such as spell checking, font and style changes, etc.), transmission and receipt controls, etc. Furthermore, the keyboard application can implement search functionality, and in some examples provide that search functionality, or results of that search functionality, to the first application.

UI module 120 manages user interactions with PSD 112 and other components of computing device 110. In other words, UI module 120 may act as an intermediary between various components of computing device 110 to make determinations based on user input detected by PSD 112 and generate output at PSD 112 in response to the user input. UI module 120 may receive instructions from an application, service, platform, or other module of computing device 110 to cause PSD 112 to output a user interface (e.g., user interface 114). UI module 120 may manage inputs received by computing device 110 as a user views and interacts with the user interface presented at PSD 112 and update the user interface in response to receiving additional instructions from the application, service, platform, or other module of computing device 110 that is processing the user input.

Keyboard module 122 represents an application, service, or component executing at or accessible to computing device 110 that provides computing device 110 with a graphical keyboard having integrated search features. Keyboard module 122 may switch between operating in text-entry mode in which keyboard module 122 functions similar to a traditional graphical keyboard, or search mode in which keyboard module 122 performs various integrated search functions.

In some examples, keyboard module 122 may be a stand-alone application, service, or module executing at computing device 110 and in other examples, keyboard module 122 may be a sub-component of an operating system controlling operation of device 110. For example, keyboard module 122 may be integrated into a chat or messaging application executing at computing device 110 whereas in other examples, keyboard module 122 may be a stand-alone application or subroutine that is invoked by an application or operating platform of computing device 110 any time an application or operating platform requires graphical keyboard input functionality. In some examples, computing device 110 may download and install keyboard module 122 from an application repository of a service provider (e.g., via the Internet). In other examples, keyboard module 122 may be preloaded as part of the operating system of computing device 110.

When operating in text-entry mode, keyboard module 122 of computing device 110 may perform traditional, graphical keyboard operations used for text-entry, such as: generating a graphical keyboard layout for display at PSD 112, mapping detected inputs at PSD 112 to selections of graphical keys, determining characters based on selected keys, or predicting or autocorrecting words and/or phrases based on the characters determined from selected keys.

Graphical keyboard 116B includes graphical elements displayed as graphical keys 118A. Keyboard module 122 may output information to UI module 120 that specifies the layout of graphical keyboard 116B within user interface 114. For example, the information may include instructions that specify locations, sizes, colors, and other characteristics of graphical keys 118A. Based on the information received from keyboard module 122, UI module 120 may cause PSD 112 to display graphical keyboard 116B as part of user interface 114.

Each key of graphical keys 118A may be associated with a respective character (e.g., a letter, number, punctuation, or other character) displayed within the key. A user of computing device 110 may provide input at locations of PSD 112 at which one or more of graphical keys 118A are displayed to input content (e.g., characters, search results, etc.) into edit region 116C (e.g., for composing messages that are sent and displayed within output region 116A or for inputting a search query that computing device 110 executes from within graphical keyboard 116B). Keyboard module 122 may receive information from UI module 120 indicating locations associated with input detected by PSD 112 that are relative to the locations of each of the graphical keys. Using a spatial and/or language model, keyboard module 122 may translate the inputs to selections of keys and characters, words, and/or phrases.

For example, PSD 112 may detect user inputs as a user of computing device 110 provides the user inputs at or near a location of PSD 112 where PSD 112 presents graphical keys 118A. UI module 120 may receive, from PSD 112, an indication of the user input detected by PSD 112 and output, to keyboard module 122, information about the user input. Information about the user input may include an indication of one or more touch events (e.g., locations and other information about the input) detected by PSD 112.

Based on the information received from UI module 120, keyboard module 122 may map detected inputs at PSD 112 to selections of graphical keys 118A, determine characters based on selected graphical keys 118A, and predict or autocorrect words and/or phrases determined based on the characters associated with the selected keys 118A. For example, keyboard module 122 may include a spatial model that may determine, based on the locations of keys 118A and the information about the input, the most likely one or more keys 118A being selected. Responsive to determining the most likely one or more keys 118A being selected, keyboard module 122 may determine one or more characters, words, and/or phrases. For example, each of the one or more keys 118A being selected from a user input at PSD 112 may represent an individual character or a keyboard operation. Keyboard module 122 may determine a sequence of characters selected based on the one or more selected keys 118A. In some examples, keyboard module 122 may apply a language model to the sequence of characters to determine one or more the most likely candidate letters, morphemes, words, and/or phrases that a user is trying to input based on the selection of keys 118A.

Keyboard module 122 may send the sequence of characters and/or candidate words and phrases to UI module 120 and UI module 120 may cause PSD 112 to present the characters and/or candidate words determined from a selection of one or more keys 118A as text within edit region 116C. In some examples, when functioning as a traditional keyboard for performing text-entry operations, and in response to receiving a user input at graphical keys 118A (e.g., as a user is typing at graphical keyboard 116B to enter text within edit region 116C), keyboard module 122 may cause UI module 120 to display the candidate words and/or phrases as one or more selectable spelling corrections and/or selectable word or phrase suggestions within suggestion region 118B.

In addition to performing traditional, graphical keyboard operations used for text-entry, keyboard module 122 of computing device 110 also provides integrated search capability. That is, rather than requiring a user of computing device 110 to navigate away from user interface 114 which provides graphical keyboard 116B (e.g., to a different application or service executing at or accessible from computing device 110), keyboard module 122 may operate in search mode in which keyboard module 122 may invoke search operations and present search results within the same region of PSD 112 at which graphical keyboard 116B is displayed. Keyboard module 122 may include routines for executing search functions and/or may include interfaces for communicating with a separate search engine or resource that receives search parameters from keyboard module 122 and returns search results. Search functionality invoked by keyboard module 122 may search memory of device 110 and/or external memory.

As indicated above, keyboard module 122 may execute as a stand-alone application, service, or module executing at computing device 110 or as a single, integrated sub-component thereof. Therefore, if keyboard module 122 forms part of a chat or messaging application executing at computing device 110, keyboard module 122 may provide the chat or messaging application with text-entry capability as well as search capability. Similarly, if keyboard module 122 is a stand-alone application or subroutine that is invoked by an application or operating platform of computing device 110 any time an application or operating platform requires graphical keyboard input functionality, keyboard module 122 may provide the invoking application or operating platform with text-entry capability as well as search capability.

Keyboard module 122 may further operate in search mode. In some examples, when operating in search mode, keyboard module 122 may cause graphical keyboard 116B to include search element 118C. Search element 118C represents a selectable element of graphical keyboard 116B for invoking one or more of the various search features of graphical keyboard 116B. By selecting search element 118C (e.g., by tapping or gesturing at a location or within a region of PSD 112 at which search element 118C is displayed), a user can cause computing device 110 to invoke the various integrated search features without having to navigate to a separate application, service, or other feature executing at or accessible from computing device 110.

For example, UI module 120 may output information to keyboard module 122 indicating that a user of computing device 110 may have selected search element 118C. Responsive to determining that search element 118C was selected, keyboard module 122 may transition to operating in search mode. While operating in search mode, keyboard module 122 may reconfigure graphical keyboard 116B to execute search features as opposed to operations that are primarily attributed to text entry.

For example, keyboard module 122 may configure suggestion region 118B to present suggested content (e.g., predicted search queries, predicted emoticons or so called "emojis", other suggested content, or other iconography symbols) as selectable elements within search suggestion region 118B instead of predicted characters, words or phrases or other primarily linguistic information that keyboard module 122 derives from a language model, lexicon, or dictionary. In other words, rather than providing spelling or word suggestions from a dictionary within suggestion region 118B, computing device 110 may include, within suggestion region 118B, suggested search related content that computing device 110 determines may assist a user in providing input related to electronic communications.

In other examples, keyboard module 122 may configure the graphical keyboard 116B to include a query suggestion region 118D that presents suggested content (e.g., predicted or suggested search queries, predicted emoticons, emojis, other iconographic symbols, and other suggested content) as selectable elements above the graphical keys 118A. In other words, keyboard module 122 may in some examples configure the graphical keyboard 116B to include query suggestion region 118D positioned between edit region 116C and graphical keys 118A. In the example shown in FIG. 1, the query suggestion region 118D is also positioned near (e.g., adjacent to, above, below, on either side of, etc.) the suggestion region 118B, which may have input focus. In some examples where the user interface 114 may be configured differently, the query suggestion region 118D may be positioned between the graphical keys 118A and the edit region 116C, including in an example where the query suggestion region is positioned below the graphical keys and above the edit region. In still further examples, the query suggestion region may be positioned between the suggestion region 118B and the edit region 116C, including an example where the query suggestion region is positioned below the suggestion region and above the edit region. Other alternative arrangements of the graphical user interface are possible, including arrangements where the query suggestion region is not positioned between the graphical keys and the edit region, or between the suggestion region and the edit region.

In some examples, input focus means that input detected by the computing device 110 may be output to one or more specific user interface component(s) that are designated as having input focus. For instance, as PSD 112 detects user input at or near a location of PSD 112 where PSD 112 presents graphical keyboard 116B, UI module 120 may receive an indication of input and may output to the keyboard module information about the input. In some examples where the keyboard module 122 determines that the user is providing input at graphical keys 118A that correspond to a string of characters, the keyboard module 122 may cause UI module 120 to update the user interface 114 to include that string of characters within the user interface 114. Where that string of characters may be positioned or displayed within the user interface may be determined by which user interface component(s) have input focus. User interface 114, for example, includes several user interface components, including edit region 116C, suggestion region 118B, search element 118C, and output region 116A. In an example where suggestion region 118B has input focus, the computing device 110 may format and display within suggestion region 118B the string of characters corresponding to the input.

At times, in some examples, no user interface component will have input focus. In other examples, only one interface component will have input focus at a given time, and only certain types of user interface components might be allowed or be qualified to have input focus, such as text boxes or edit boxes. The computing device 110 may determine, in some examples, which user interface component has input focus by detecting which qualifying user interface component last received touch input by the user. In other words, when PSD 112 detects user input at a location of PSD 112 corresponding to a particular user interface component, computing device 110 may give that user interface component input focus (if it is allowed or qualified to have input focus). In other examples, the computing device 110 determines which user interface component has input focus by detecting which user interface component last received input from a cursor. In still other examples, computing device 110 may determine which user interface component has input focus based on a setting configured by an application executing on the computing device 110. For some user interface components, such as edit region 116C or suggestion region 118B, a flashing cursor 119 may in some examples be displayed within the interface component to provide a visual cue indicating that it has input focus.

In FIG. 1, PSD 112 may detect user inputs at or near a location of PSD 112 where PSD 112 presents graphical keys 118A, and output to the UI module 220 an indication of the user input detected by PSD 112. The UI module 120 may output to the keyboard module 122 information about the input. Responsive to the information about the input, keyboard module 122 determines a string of characters that corresponds to the input, and then causes the UI module 120 to update the user interface 114 to include that string of characters in the suggestion region 118B, which has input focus in FIG. 1. As shown in the example of FIG. 1, the keyboard module 122 determines the string of characters corresponding to the input in this case to be the "meatball sho" string of characters displayed in the suggestion region 118B.

Keyboard module 122 may also determine suggested queries based on the information about the input received from UI module 120. Responsive to the information about the input received from UI module 120, the keyboard module 122 may determine suggested queries and cause the UI module 120 to update the user interface 114 to include the suggested queries in the query suggestion region 118D. As shown in the example of FIG. 1, the suggested queries generated by the keyboard module 122 may include "Meatball Shoppe," "Meatball," and "Meatball recipe easy." As the PSD 112 continues to detect user inputs corresponding to locations of PSD 112 that present graphical keys 118A, information about additional input is received by the keyboard module 122, which in response to the additional input, may determine updated suggested queries. The keyboard module 122 may cause UI module 120 to update the user interface 114 as updated suggested queries are determined.

The keyboard module 122 may determine suggested queries based on the information about user input received from the UI module 120, but the suggested queries may also be determined based on an application the user is interacting with, the context of the user's activity, or some combination thereof. The keyboard module 122 may also determine the suggested queries based on historical information about the user. For example, in some examples, search query suggestions may come from chat conversations on computing device 110. The text message "do you want to get dinner?" may suggest a "Restaurants near me" query; the text message "did you watch the basketball game?" may suggest a "Team Name" query of a professional basketball team. In accordance with one or more aspects of the present disclosure, when computing device 110 may be displaying suggested search queries, the graphical keyboard 116B in FIG. 1 may be considered to be in search mode or suggest mode.

In the example of FIG. 1, the user may optionally provide input at a location of PSD 112 at which a suggested query is displayed. In some examples, in response to receiving an indication of input selecting one of the suggested queries, keyboard module 122 may obtain information associated with the suggested query, which may involve invoking a search operation using the content of the link as a search query, or otherwise conducting a search for information based on the suggested query. In other examples, in response to receiving an indication of input selecting one of the suggested queries, keyboard module 122 may obtain information associated with the search query without invoking a search operation or performing a search, such as when the suggested query points directly an item of information, or points to an item of information (e.g., a document or contact) on the device 110.

In some examples, while a search operation is being conducted, the keyboard module 122 may cause the UI module 120 to update the user interface 114, and may cause the UI module 120 to further update the user interface 114 when search results are available. In some examples, the keyboard module 122 may cause UI module 120 to update the user interface 114 so that the search results are displayed within the graphical keyboard 116B. In accordance with one or more aspects of the present disclosure, when search results are being displayed, the graphical keyboard 116B may be considered to be in results mode.

By presenting a graphical keyboard with integrated search features, such as the graphical keyboard 116B of FIG. 1, an example computing device may perform search operations without requiring the user to leave the current application that the user is interacting with, and without the user losing focus. In some examples, the example computing device may present search results obtained from performing a search of a suggested query and the user may then review or interact with the search results as the example device presents them on a screen. For example, the user may provide additional input causing the computing device to incorporate the search results or information obtained from the search results into a current activity or task, or share the search results or information obtained from the search results with other devices. Techniques in accordance with the present disclosure may also enable a computing device to output or present to the user suggested search queries, potentially facilitating and streamlining the process for performing a search. Automatically displaying suggested search queries may result in the computing device receiving fewer inputs related to search, because fewer inputs may be required to cause a device to perform a search based on a suggested query that is automatically presented within a graphical keyboard. By receiving fewer inputs, the computing device may process fewer user inputs, execute fewer operations, and as a result, consume less electrical power.

Figure 2:
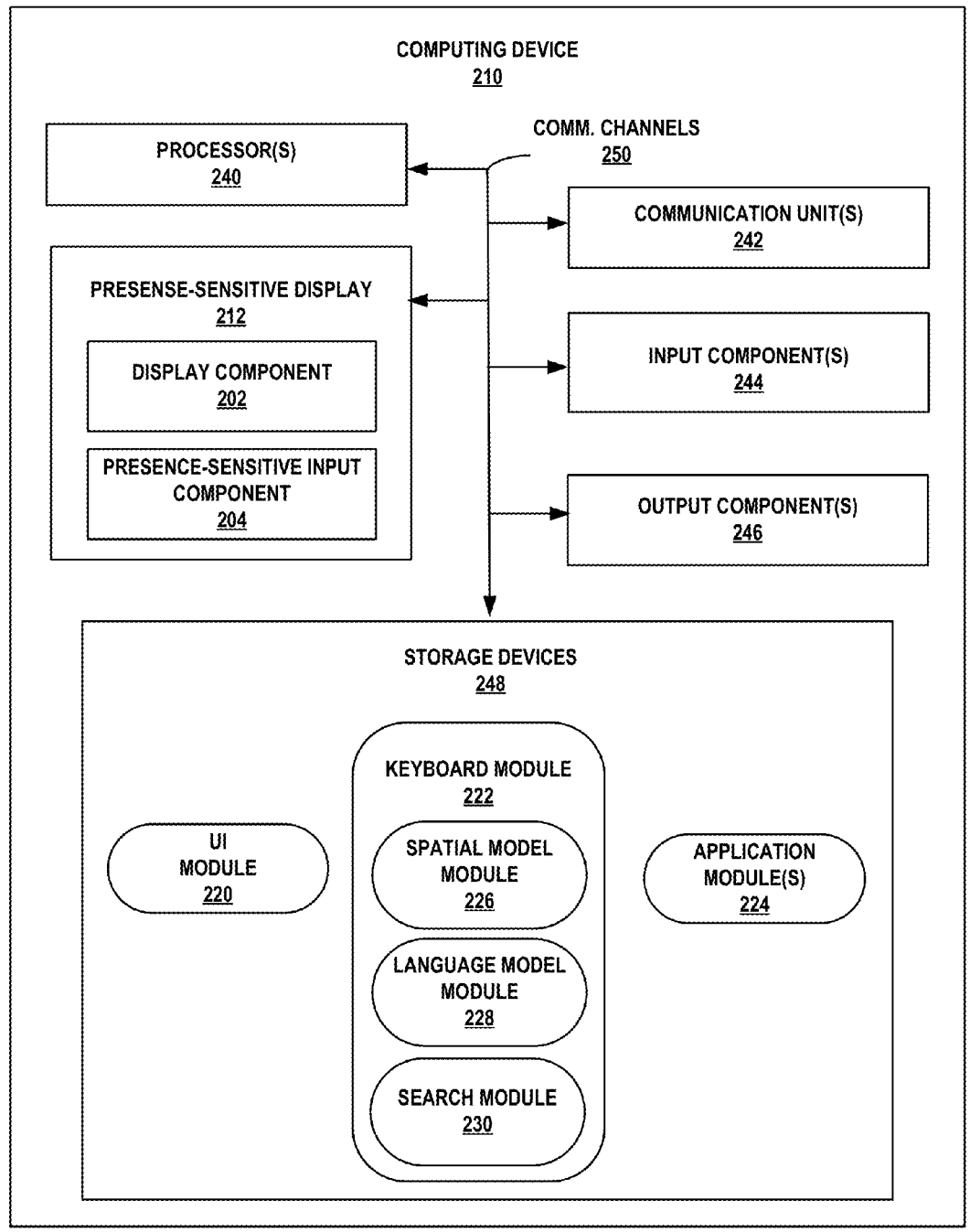
FIG. 2 is a block diagram illustrating an example computing device that is configured to present a graphical keyboard with integrated search features, in accordance with one or more aspects of the present disclosure.

FIG. 2 is a block diagram illustrating computing device 210 as an example computing device that is configured to present a graphical keyboard with integrated search features, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes PSD 212, one or more processors 240, one or more communication units 242, one or more input components 244, one or more output components 246, and one or more storage components 248. Presence-sensitive display 212 includes display component 202 and presence-sensitive input component 204. Storage components 248 of computing device 210 include UI module 220, keyboard module 222, and one or more application modules 224. Keyboard module 122 may include spatial model ("SM") module 226, language model ("LM") module 228, and search module 230. Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

PSD 212 of computing device 210 may be similar to PSD 112 of computing device 110 and includes display component 202 and presence-sensitive input component 204. Display component 202 may be a screen at which information is displayed by PSD 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as user interface 114 of FIG. 1).

While illustrated as an internal component of computing device 210, PSD 212 may also represent an external component that shares a data path with computing device 210 for transmitting and/or receiving input and output. For instance, in one example, PSD 212 represents a built-in component of computing device 210 located within and physically connected to the external packaging of computing device 210 (e.g., a screen on a mobile phone). In another example, PSD 212 represents an external component of computing device 210 located outside and physically separated from the packaging or housing of computing device 210 (e.g., a monitor, a projector, etc. that shares a wired and/or wireless data path with computing device 210).

PSD 212 of computing device 210 may detect two-dimensional and/or three-dimensional gestures as input from a user of computing device 210. For instance, a sensor of PSD 212 may detect a user's movement (e.g., moving a hand, an arm, a pen, a stylus, etc.) within a threshold distance of the sensor of PSD 212. PSD 212 may determine a two or three dimensional vector representation of the movement and correlate the vector representation to a gesture input (e.g., a hand-wave, a pinch, a clap, a pen stroke, etc.) that has multiple dimensions. In other words, PSD 212 can detect a multi-dimension gesture without requiring the user to gesture at or near a screen or surface at which PSD 212 outputs information for display. Instead, PSD 212 can detect a multi-dimensional gesture performed at or near a sensor which may or may not be located near the screen or surface at which PSD 212 outputs information for display.

One or more processors 240 may implement functionality and/or execute instructions associated with computing device 210. Examples of processors 240 include application processors, display controllers, auxiliary processors, one or more sensor hubs, and any other hardware configured to function as a processor, a processing unit, or a processing device. Modules 220, 222, 224, 226, 228, and 230 may be operable by processors 240 to perform various actions, operations, or functions of computing device 210. For example, processors 240 of computing device 210 may retrieve and execute instructions stored by storage components 248 that cause processors 240 to perform the operations modules 220, 222, 224, 226, 228, and 230. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 224, 226, 228, and 230 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include disc storage, flash memories, or forms of electrically programmable memories (EPROM) or electrically erasable and programmable (EEPROM) memories. Storage components 248 may store program instructions and/or information (e.g., data) associated with modules 220, 222, 224, 226, 228, and 230. Storage components 248 may include a memory configured to store data or other information associated with modules 220, 222, 224, 226, 228, and 230.

UI module 220 may include all functionality of UI module 120 of computing device 110 of FIG. 1 and may perform similar operations as UI module 120 for managing a user interface (e.g., user interface 114) that computing device 210 provides at presence-sensitive display 212 for handling input from a user. For example, UI module 220 of computing device 210 may query keyboard module 222 for a keyboard layout (e.g., an English language QWERTY keyboard, etc.). UI module 220 may transmit a request for a keyboard layout over communication channels 250 to keyboard module 222. Keyboard module 222 may receive the request and reply to UI module 220 with data associated with the keyboard layout. UI module 220 may receive the keyboard layout data over communication channels 250 and use the data to generate a user interface. UI module 220 may transmit a display command and data over communication channels 250 to cause PSD 212 to present the user interface at PSD 212.

In some examples, UI module 220 may receive an indication of one or more user inputs detected at PSD 212 and may output information about the user inputs to keyboard module 222. For example, PSD 212 may detect a user input and send data about the user input to UI module 220. UI module 220 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input.

Based on location information of the touch events generated from the user input, UI module 220 may determine that the detected user input is associated the graphical keyboard. UI module 220 may send an indication of the one or more touch events to keyboard module 222 for further interpretation. Keyboard module 22 may determine, based on the touch events received from UI module 220, that the detected user input represents an initial selection of one or more keys of the graphical keyboard.

Application modules 224 represent all the various individual applications and services executing at and accessible from computing device 210 that may rely on a graphical keyboard having integrated search features. A user of computing device 210 may interact with a graphical user interface associated with one or more application modules 224 to cause computing device 210 to perform a function. Numerous examples of application modules 224 may exist and include, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at computing device 210.

Keyboard module 222 may include all functionality of keyboard module 122 of computing device 110 of FIG. 1 and may perform similar operations as keyboard module 122 for providing a graphical keyboard having integrated search features. Keyboard module 222 may include various sub-modules, such as SM module 226, LM module 228, and search module 230, which may perform the functionality of keyboard module 222.

SM module 226 may receive one or more touch events as input, and output a character or sequence of characters that likely represents the one or more touch events, along with a degree of certainty or spatial model score indicative of how likely or with what accuracy the one or more characters define the touch events. In other words, SM module 226 may infer touch events as a selection of one or more keys of a keyboard and may output, based on the selection of the one or more keys, a character or sequence of characters.

When keyboard module 222 operates in text-entry mode LM module 228 may receive a character or sequence of characters as input, and output one or more candidate characters, words, or phrases that LM module 228 identifies from a lexicon as being potential replacements for a sequence of characters that LM module 228 receives as input for a given language context (e.g., a sentence in a written language). Keyboard module 222 may cause UI module 220 to present one or more of the candidate words at suggestion regions 118B and 118D of user interface 114.

The lexicon of computing device 210 may include a list of words within a written language vocabulary (e.g., a dictionary). For instance, the lexicon may include a database of words (e.g., words in a standard dictionary and/or words added to a dictionary by a user or computing device 210. LM module 228 may perform a lookup in the lexicon, of a character string, to identify one or more letters, words, and/or phrases that include parts or all of the characters of the character string. For example, LM module 228 may assign a language model probability or a similarity coefficient (e.g., a Jaccard similarity coefficient) to one or more candidate words located at a lexicon of computing device 210 that include at least some of the same characters as the inputted character or sequence of characters. The language model probability assigned to each of the one or more candidate words indicates a degree of certainty or a degree of likelihood that the candidate word is typically found positioned subsequent to, prior to, and/or within, a sequence of words (e.g., a sentence) generated from text input detected by presence-sensitive input component 204 prior to and/or subsequent to receiving the current sequence of characters being analyzed by LM module 228. In response to determining the one or more candidate words, LM module 228 may output the one or more candidate words from lexicon data stores 260A that have the highest similarity coefficients.

Search module 230 of keyboard module 222 may perform integrated search functions on behalf of keyboard module 222. That is, when invoked (e.g., automatically based on text input analysis or manually in response to a user of computing device 210 selecting selectable search element 118C of user interface 114), keyboard module 222 may operate in search mode where keyboard module 222 enables computing device 210 to perform search functions from within graphical keyboard 116B.

When keyboard module 222 operates in search mode, search module 230 may receive a character or sequence of characters or other information as input, and output one or more query suggestions that the search module 230 identifies based on the input. The information that the search module 230 receives as input may include characters or a sequence of characters, and in some examples, may also include information about the current state of the application that the user is using, as well as other information, such as information from the application that is relying on keyboard module 122 (e.g., recent texts, pictures, geolocation data and the like) and contextual information associated with the user and computing device 210. Search module 230 may use this information to generate one or more suggested queries. The keyboard module 222 may cause UI module 220 to present one or more of the suggested queries within the query suggestion region 118D of user interface 114.

In some examples, search model 230 may further rely on a current context of computing device 210 to determine a suggested query. As used herein, a current context specifies the characteristics of the physical and/or virtual environment of a computing device, such as computing device 210, and a user of the computing device, at a particular time. In addition, the term "contextual information" is used to describe any information that can be used by a computing device to define the virtual and/or physical environmental characteristics that the computing device, and the user of the computing device, may experience at a particular time.

Examples of contextual information are numerous and may include: sensor information obtained by sensors (e.g., position sensors, accelerometers, gyros, barometers, ambient light sensors, proximity sensors, microphones, and any other sensor) of computing device 210, communication information (e.g., text based communications, audible communications, video communications, etc.) sent and received by communication modules of computing device 210, and application usage information associated with applications executing at computing device 210 (e.g., application data associated with applications, Internet search histories, text communications, voice and video communications, calendar information, social media posts and related information, etc.). Further examples of contextual information include signals and information obtained from transmitting devices that are external to computing device 210.

In some examples, computing device 210 may initiate a search in response to different types of input. For example, keyboard module 222 may initiate a search in response to detecting user input at a location at which PSD 212 presents a suggested query within the query suggestion region 118D or elsewhere. This input may generally correspond to the user selecting one of the displayed suggested queries. In another example, keyboard module 222, while operating in search mode, may initiate a search in response to detecting user input at locations at which PSD 212 presents graphical keys 118A followed by input at a location at which PSD 212 presents a "return" or "search" or "send" key. Such input may generally correspond to the user typing a search query using the graphical keyboard 116B and hitting "return" without selecting a suggested search query.

Responsive to detecting user input that causes computing device 210 to initiate a search, the search module 230 within the keyboard module 222 may execute a search, which may cause the computing device 210 to send and receive information over a public or private network through communication unit(s) 242. If search results become available, the search module 230 or keyboard module 222 may then cause the UI module 220 to present search result information to the user by, in some examples, displaying search result information in user interface 114.

Figure 3:
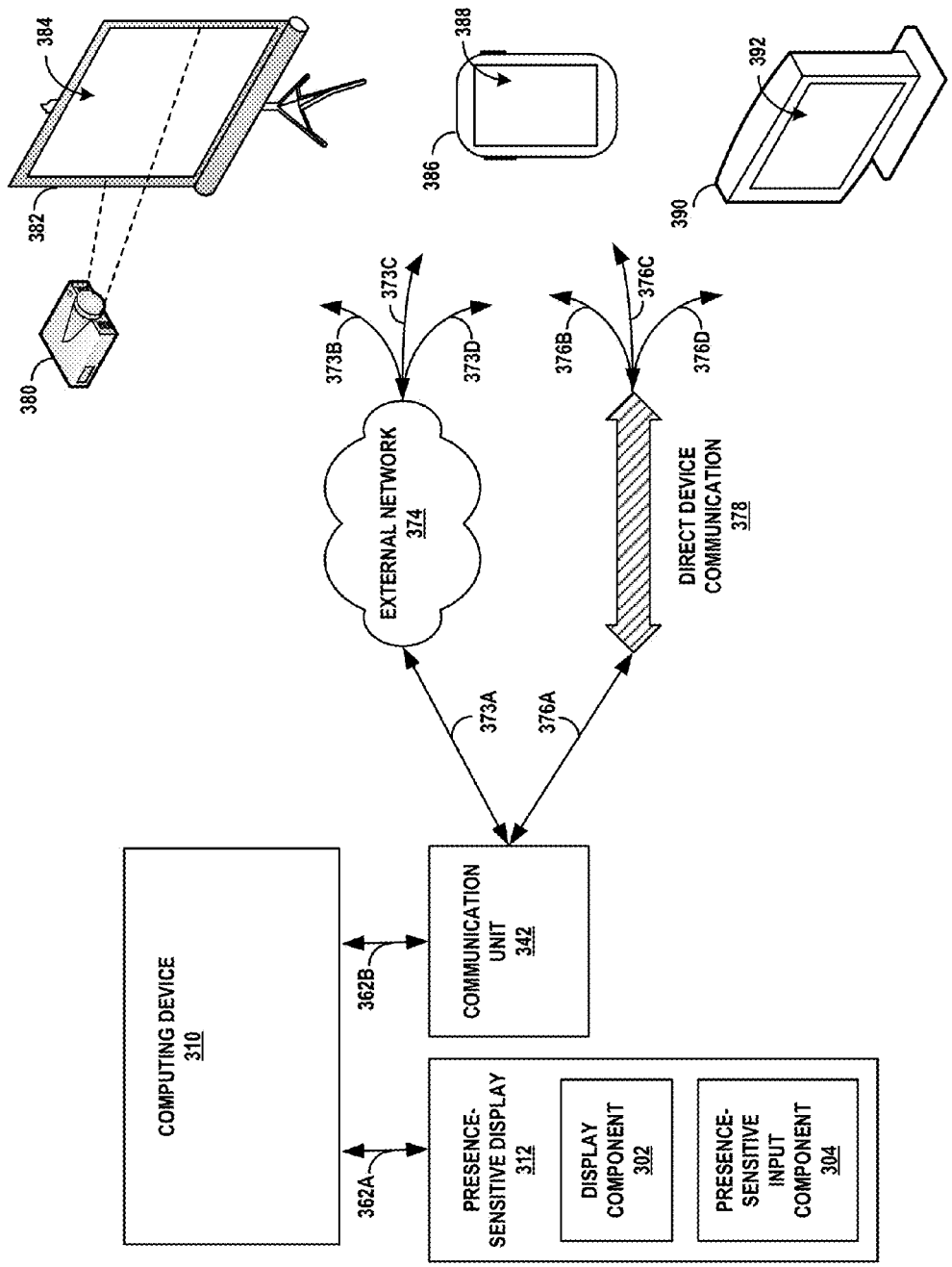
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 310, a PSD 312, communication unit 342, projector 380, projector screen 382, mobile device 386, and visual display component 390. In some examples, PSD 312 may be a presence-sensitive display as described in FIGS. 1-2. Although shown for purposes of example in FIGS. 1 and 2 as a stand-alone computing device 110, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 240 in FIG. 2. In such examples, computing device 310 may be operatively coupled to PSD 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to PSD 312 and communication unit 342 by any number of one or more communication channels.

In other examples, such as illustrated previously by computing device 110 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

PSD 312 may include display component 302 and presence-sensitive input component 304. Display component 302 may, for example, receive data from computing device 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to computing device 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, computing device 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with computing device 310. In some examples, the one or more communication units may enable communication between projector 380 and projector screen 382. Projector 380 may receive data from computing device 310 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 310. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of presence-sensitive display 112 and/or 312 as described in this disclosure. In some examples, presence-sensitive display 384 may include additional functionality. Projector screen 382 (e.g., an electronic whiteboard), may receive data from computing device 310 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 310.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other devices such as televisions, computer monitors, etc. In some examples, visual display component 390 may be a vehicle cockpit display or navigation display (e.g., in an automobile, aircraft, or some other vehicle). In some examples, visual display component 390 may be a home automation display or some other type of display that is separate from computing device 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112, 212, and/or 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at PSD 312 that is coupled to computing device 310 by a system bus or other suitable communication channel. Computing device 310 may also output graphical content for display at one or more remote devices, such as projector 380, projector screen 382, mobile device 386, and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as projector 380, projector screen 382, mobile device 386, and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at PSD 312 that is operatively coupled to computing device 310. In other examples, computing device 310 may output graphical content for display at both a PSD 312 that is coupled to computing device 310 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 310 and output for display at PSD 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between computing device 310 and the remote devices illustrated in FIG. 3. In some examples, network links 373A-373D may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 310 by communication links 376A-376D. In some examples, communication links 376A-376D may be connections using Bluetooth, Near-Field Communication, Universal Serial Bus, infrared, etc. Such connections may be wireless and/or wired connections.

In accordance with techniques of the disclosure, computing device 310 may in some examples be operatively coupled to visual display component 390 using external network 374. Computing device 310 may output a graphical keyboard for display at PSD 392. For instance, computing device 310 may send data that includes a representation of the graphical keyboard to communication unit 342. Communication unit 342 may send the data that includes the representation of the graphical keyboard to visual display component 390 using external network 374. Visual display component 390, in response to receiving the data using external network 374, may cause PSD 392 to output the graphical keyboard. In response to receiving user input at PSD 392 to select one or more keys of the keyboard, visual display component 390 may send an indication of the user input to computing device 310 using external network 374.

Communication unit 342 of may receive the indication of the user input, and send the indication to computing device 310.

Computing device 310 may determine one or more candidate words or suggested search queries, and may generate an updated graphical user interface including suggested search queries, which in some examples, may be included within a query suggestion region. Communication unit 342 may receive a representation of the updated graphical user interface and may send the send the representation to visual display component 390, such that visual display component 390 may cause PSD 392 to output the updated graphical keyboard, including any suggested search queries and/or query suggestion region.

FIGS. 4A-4D are conceptual diagrams illustrating example graphical user interfaces of an example computing device that is configured to present a graphical keyboard in accordance with one or more aspects of the present disclosure. FIGS. 4A-4D illustrate example user interfaces 414; many other examples of graphical user interfaces may be used or presented in other instances or examples. Each of the user interfaces 414 may correspond to a graphical user interface output by computing devices 110, 210, or 310 from FIGS. 1-3. For purposes of illustration, FIGS. 4A-4D are described below within the context of computing device 210 of FIG. 2.

As illustrated in the examples of FIGS. 4A through 4D, each example user interface 414 forms part of a chat application user interface of a chat application from application module 224. User interface 414 includes output region 416A, edit region 416C, and graphical keyboard 416B. Output region 416A and edit region 416C may both be associated with the user interface of an application or service executing on or accessible from computing device 210. Included within the graphical keyboard 416B are graphical elements displayed as keys 418A. Also included within graphical keyboard 416B is a suggestion region 418B, which may include suggested words or other information representing selectable spelling corrections and/or selectable word suggestions to replace character strings that are included within edit region 416C. Additionally, suggestion region 418B may include suggested queries that may be of interest to the user based on information that may include the user's current activity, context, location, or situation.

Figure 4A:
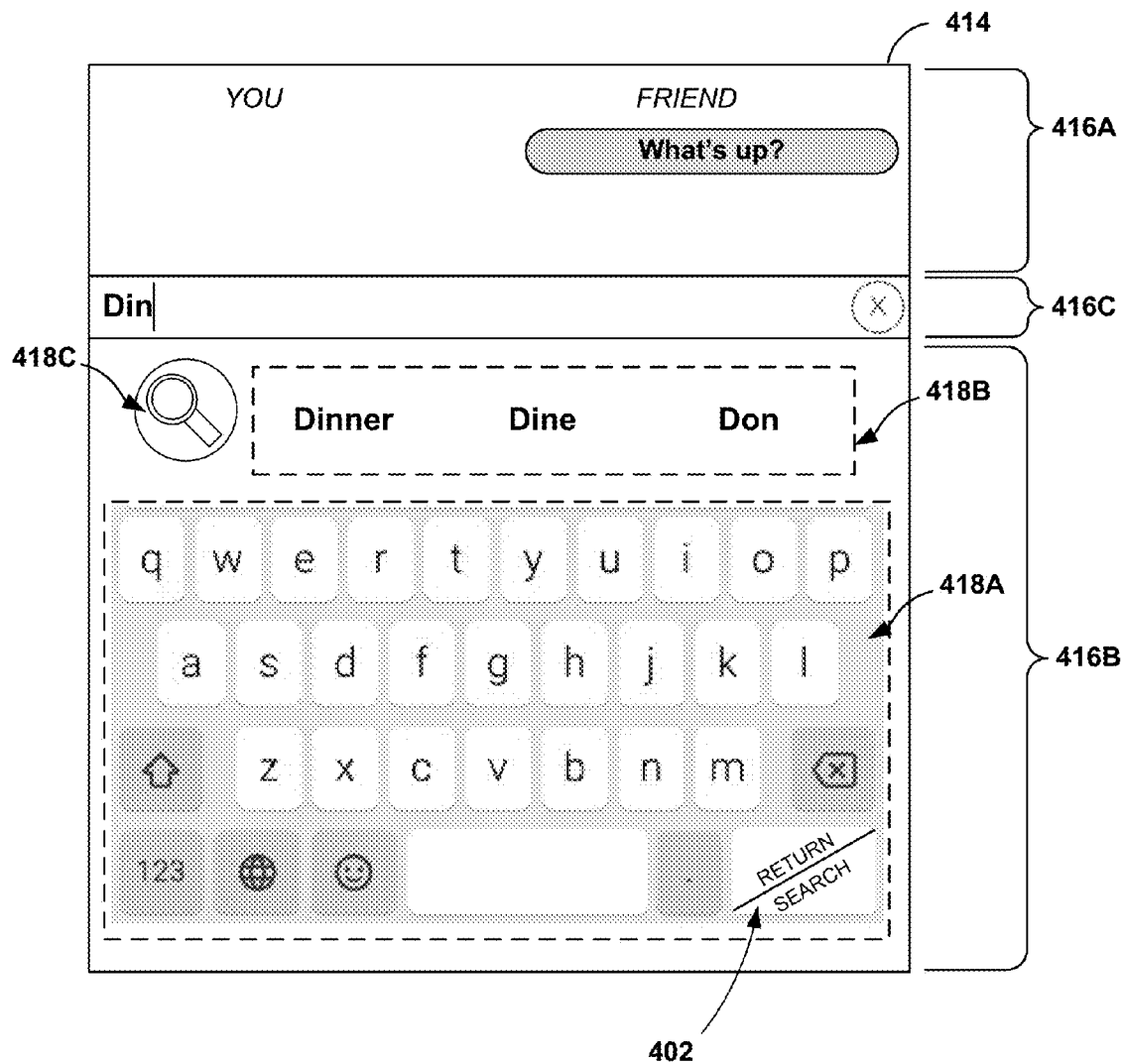
FIGS. 4A-4D are conceptual diagrams illustrating example graphical user interfaces of an example computing device that is configured to present a graphical keyboard with integrated search features, in accordance with one or more aspects of the present disclosure.

Also shown included within graphical keyboard 416B in the example of FIG. 4A is a search element 418C. In some examples, computing device 210 may receive an indication of user input selecting the search element 418C, and in response, computing device 210 may cause graphical keyboard 416B transition to search mode in accordance with one or more aspects of the present disclosure. In the example shown, the search element 418C is displayed above the graphical keys 418A, but it may be located elsewhere within the graphical keyboard 416B. In other examples, the search element 418C may be located elsewhere within the user interface 414, including partially or entirely outside of the graphical keyboard 416B. In still other examples, the search element 418C or a component used in a similar way could be implemented as an external input or hardware input, such as an external button, switch, or other hardware input component configured to receive user input for computing device 210.

Included within graphical keys 418A is a return/search key 402. In some examples, computing device 210 may respond to an indication of input selecting key 402 by transmitting to another device the string of characters in edit region 416C as a text message. Computing device 210 may also cause the string of characters in the edit region 416C to be formatted and displayed within the output region 416A, which in some examples may signify that the string of characters was transmitted as a text message. For instance, in response to receiving user input at locations of PSD 112 corresponding to the key 402, computing device 210 may update the user interface 414 so that presented in output region 416A is the text that was displayed in edit region 416C when the computing device received the indication of input selecting key 402. In other situations, such as when the graphical keyboard 416B may be in search mode as described in accordance with one or more aspects of the present disclosure, the computing device 210 may respond to an indication of input selecting the return/search key 402 by performing a search using, for example, the information or text displayed within the suggestion region 418B when the computing device 210 received the indication of input selecting the key 402.

Although the return/search key 402 is shown as a single graphical key in the example of FIG. 4A, in other examples the key 402 could be presented or implemented as more than one key. In one example, the return/search key 402 could alternatively be implemented as a discrete graphical return key and a discrete graphical search key. In other examples, the graphical keyboard 416B could include a discrete graphical return key and a discrete graphical search key, but may not always include a graphical representation of both keys within the graphical keyboard 416B. In still further examples, the computing device 210 may display a discrete graphical search key only when the graphical keyboard 416B is in search mode in accordance with one or more aspects of the present disclosure.

With reference to FIG. 4A, computing device 210 may receive an electronic communication or text message from a friend's device. Computing device 210 may output the content of the friend's text message ("What's up?") within the user interface 414 in output region 416A. Keyboard module 222 of computing device 210 may then receive an indication of input selecting graphical keys 418A and determine a character string ("Din") based on the indication of input, which the computing device 210 formats and displays within edit region 416C as shown in FIG. 4A. The keyboard module 222 may also determine, based on the indication of input, candidate words ("Dinner", "Dine", and "Don"). The computing device 210 may format and displays these candidate words within suggestion region 418B.

Figure 4B:
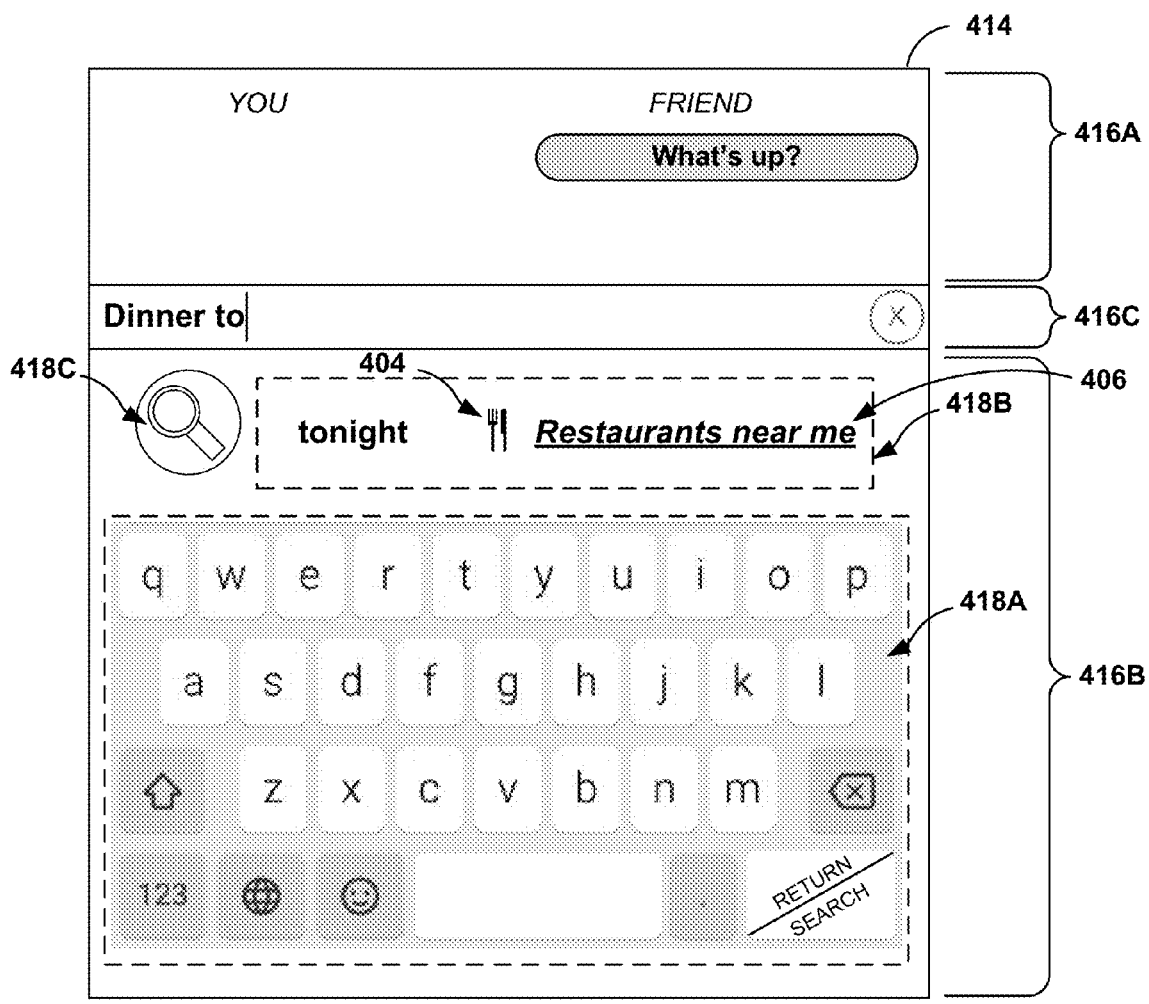

Referring now to FIG. 4B, the computing device 210 has updated the user interface 414 in FIG. 4A in response (at least partially) to further user input. In FIG. 4B, keyboard module 222 of computing device 210 may receive an indication of input selecting additional graphical keys 418A, and determine, based on the input, additional text that the computing device 210 formats and displays within edit region 416C. Keyboard module 222 may also predict one or more updated candidate words based on the further user input and display one or more updated candidate words within suggestion region 418B. In FIG. 4B, the text "Dinner to" is displayed in edit region 416C in FIG. 4B, and candidate word "tonight" is displayed in edit region 416B.

Keyboard module 222 may also determine one or more suggested queries, and as shown in FIG. 4B, computing device 210 may format and display a suggested query 406 ("Restaurants near me") within suggestion region 418B. In other examples, computing device 210 may cause multiple suggested queries to be displayed in suggestion region 418B or in other areas of user interface 414. Keyboard module 222 may generate suggested search queries based on many different sources of information, including user input, information in the edit region 416C, information in the output region 416A, current time, the user's context, application state, historical searches, and/or other information.

In some examples, computing device 210 suggests search queries after the user has typed a sentence-ending punctuation or has sent a message. Computing device 210 presents suggested search queries in the manner shown in FIG. 4B, or in other ways in accordance with one or more aspects of the present disclosure. In some examples, the computing device 210 may alert the user to availability of one or more suggested queries, such as by providing a visual, audio, tactile, or physical indication or cue. For example, the computing device 210 may alert the user to the availability of a suggested query through the search element 418C, which may change color, change shape, animate, pulse, or otherwise change to suggest that suggested queries may be available. In other examples, the computing device 210 may use other aspects of the user interface 414 to perform a similar function, or in other examples computing device 210 may vibrate or provide some other physical indication.

Computing device 210 may determine the suggested words and suggested search queries shown in suggestion region 418B based entirely on locally-stored information without access to information on a network or without sending information about the user's activity (including the user's current or past actions or communications) over a public or private network. In other examples, computing device 210 may determine suggested words and/or suggested search queries using information obtained through a public or private network, and possibly by sending information about the user (which could include information about the user's actions or communications) over a public or private network.

In some examples, on-device annotators may be used to generate suggested search queries, and such annotators may use both global and local models to detect searchable text or entities. Global models may include entities that may be useful to search regardless of the user's geolocation, such as a well-known person ("Barack Obama"). Local models may include entities such as restaurants near the user, such as a particular restaurant near the location of the computing device 210. Suggested queries could also be based on exact language triggers, such as the phrase "let's get dinner" triggering a "Restaurants near me" suggested query.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

Shown within suggestion region 418B in the example of FIG. 4B, next to the suggested query 406, is a graphical symbol of a category 404 of search, which may identify the category of a search with which the suggested query 406 may be associated. In this example, computing device 210 may cause the graphical symbol of a category 404 to be displayed to denote a category relating to a search for restaurants or food. Symbols representing other search categories may alternatively be displayed. In other examples, more than one search category element may be associated with a suggested search query, and in still further examples, there may be no search category element associated with one or more suggested search queries (or associated with any suggested search queries). In cases where a search query remains uncategorized, computing device 210 may display a generic search category element, such as a magnifying glass, to designate the search query as not being associated with any particular search category.

Figure 4C:
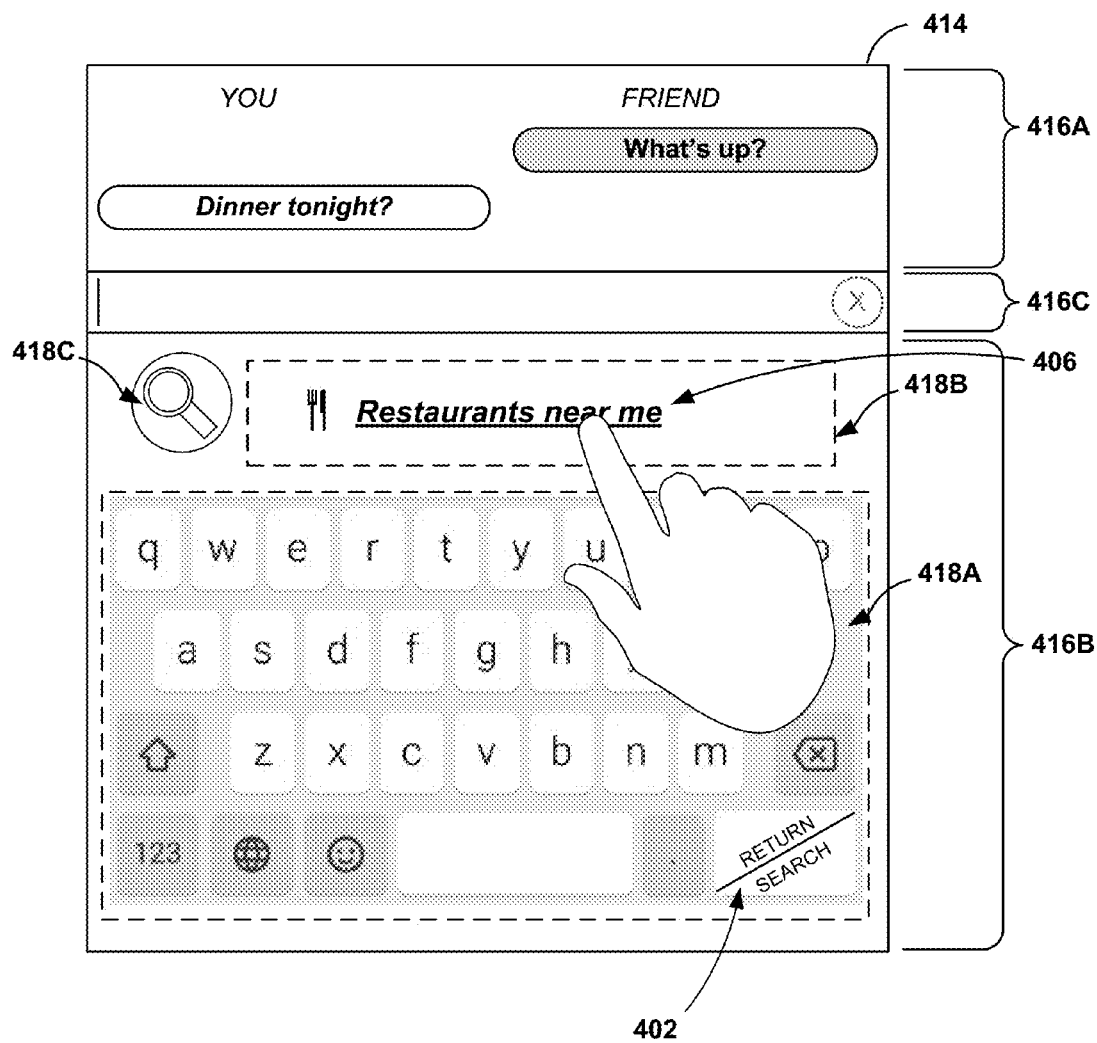

In FIG. 4C, the computing device 210 has updated the user interface 414 of FIG. 4B in response to an indication of input selecting graphical keys 118A (which the keyboard module 222 may interpret as the string of text "Dinner tonight?"), followed by an indication of input selecting the "return/search" key 402. In response, computing device 210 may compose and send a text message that includes the text "Dinner tonight?" to a friend's computing device. In FIG. 4C, computing device 210 may update the user interface 414 to include the "Dinner tonight?" text message within the output region 416A. The computing device 210 may update the user interface 414 in FIG. 4C to clear the text from the edit region 416C, and the computing device 210 may also remove the suggested word "tonight" from the suggestion region 418B. Computing device 210 may continue to display the suggested search query 406 within the suggestion region 418B in the example of FIG. 4C.

Figure 4D:
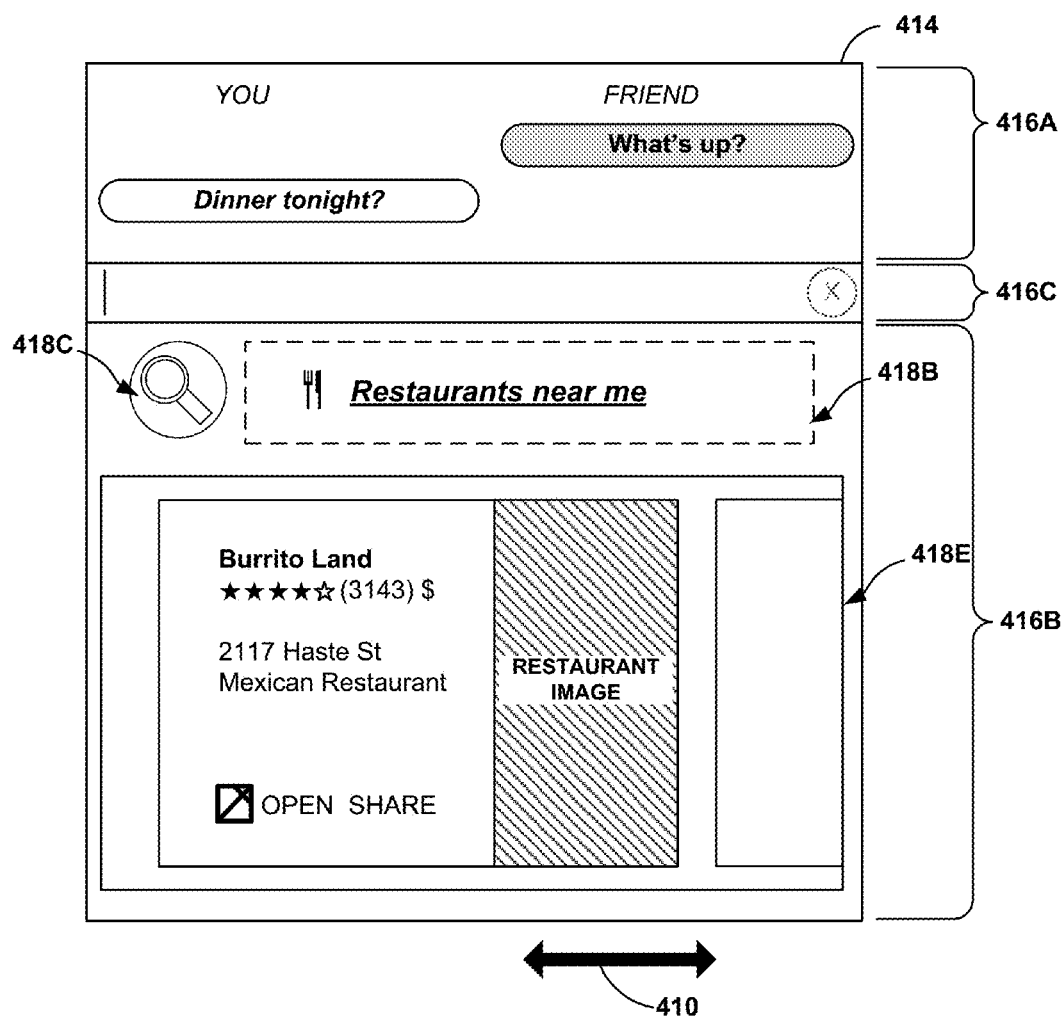

In FIG. 4D, the computing device 210 has updated the user interface 414 in response (at least partially) to detecting an indication of input selecting the suggested search query 406 ("Restaurants near me") displayed in suggestion region 418B in FIG. 4C (note the outline of a user's hand in FIG. 4C, which may signify a user's touch input associated with suggested query 406). In response to this input, the computing device 210 may perform a search based on the suggested query 406. The suggested query 406 may be a link that, when invoked by user input, will cause computing device 210 to perform a search operation, using the content of the link as a search query. (In other examples, a suggested query link might not require computing device to perform a search operation, such as when the link points directly to an item of information or to the location of the item, or represents the URL of a document or other resource.) After performing the search, the computing device 210 may output for display a textual and/or graphical indication of one or more search results (or other information) obtained by the computing device. In the example shown in FIG. 4D, the computing device 210 causes the search results 418E to be displayed within the graphical keyboard 416B. In this instance, search results 418E are presented below the suggestion region 418B, substantially replacing the graphical keys 418A previously displayed in FIG. 4C. In accordance with some aspects of present disclosure, the graphical keyboard 416B in FIG. 4D may be considered to be in results mode.

In the example of FIG. 4D, the keyboard module 222 may obtain search results based on the selected query, using the suggested query, that are or may be formatted into individual search cards 418E that keyboard module 222 causes computing device 210 to display as overlays atop graphical keys 418A (or as a temporary replacement for graphical keys 418A). In some examples, the search results 418E may be presented in a carousel format so that a user may swipe left or right 410 when browsing the search results 418E. The computing device 210 could alternatively output the search results of FIG. 4D in other formats, or in other locations within the graphical keyboard 416B. In other examples, the computing device 210 may output the search results in other locations within the user interface 414, including partially or entirely outside the graphical keyboard 416B. In still further examples, the computing device 210 may output search results partially or exclusively as audio information, and/or may output some types of search result information in tactile form.

In the example of FIG. 4D, the computing device 210 continues to present both the search element 418C and the suggestion region 418B in the graphical keyboard 416B along with, and above, the search results 418E. In other examples, the computing device 210 may cause either or both to be displayed at other locations within the user interface 414, or removed from the display.

FIGS. 5A-5F are conceptual diagrams illustrating example graphical user interfaces of an example computing device that is configured to present a graphical keyboard in accordance with one or more aspects of the present disclosure. FIGS. 5A-5F illustrate example user interfaces 514; many other examples of user interfaces may be used or presented in other instances or examples. Each of the user interfaces 514 may correspond to a graphical user interface output by computing devices 110, 210, or 310 from FIGS. 1-3. For purposes of illustration, FIGS. 5A-5F are described below within the context of computing device 210 of FIG. 2.

As illustrated in the examples of FIGS. 5A through 5F, each example user interface 514 forms part of a chat application user interface of a chat application from application module 224. User interface 514 includes output region 516A, edit region 516C, and graphical keyboard 516B. Output region 516A and edit region 516C may both be associated with the user interface of an application or service executing on or accessible from computing device 210, such as the chat application described in connection FIGS. 4A-4D. Included within the graphical keyboard 516B are graphical elements displayed as keys 518A. Also included within graphical keyboard 516B is a suggestion region 518B and search element 518C. In the example shown, the search element 518C is displayed above the graphical keys 518A, but may be located elsewhere within or outside the graphical keyboard 516B. In other examples, it may be located elsewhere within the user interface 514, or in still other examples, could be implemented as an external or hardware input to the computing device 210.

Figure 5A:
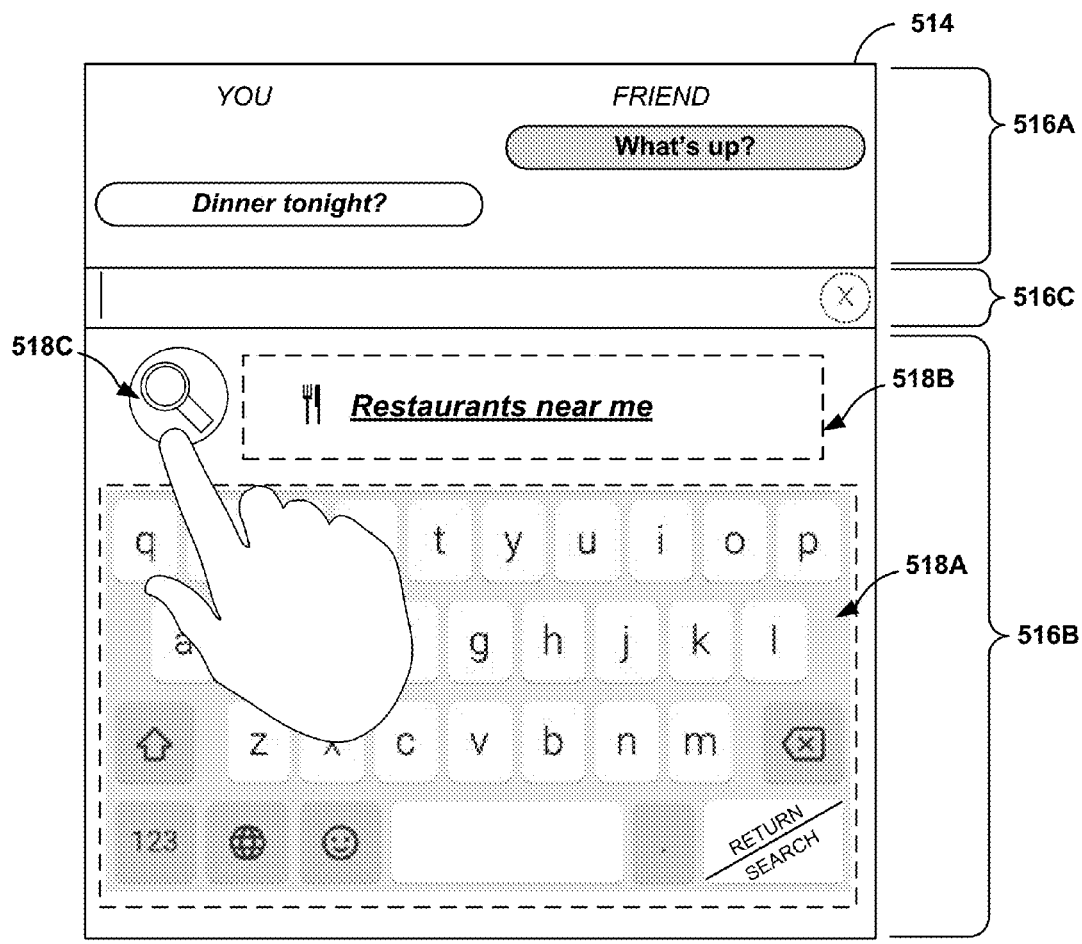
FIGS. 5A-5F are conceptual diagrams illustrating example graphical user interfaces of an example computing device that is configured to present a graphical keyboard with integrated search features, in accordance with one or more aspects of the present disclosure.

Referring to FIG. 5A, computing device 210 may be exchanging electronic messages with another device, and computing device 210 may output the content of recent exchanged messages in output region 516A. The computing device 210 may also output and format a suggested query in edit region 518B.

In some examples, computing device 210 may receive an indication of input selecting the search element 518C, and responsive to receiving the indication of input selecting the search element 518C, computing device 210 may output, for display, a separate region in which suggested search queries are displayed. For example, keyboard module 222 may receive an indication of user input detected at a location at which search element 518C is displayed within graphical keyboard 516B, as shown in FIG. 5A. Responsive to the indication of user input, the computing device 210 may update the user interface 514 to that shown in FIG. 5B so that user interface 514 includes query suggestion region 518D. In accordance with one or more aspects of the present disclosure, the graphical keyboard 516B shown in the user interface 514 of FIG. 5B may be considered to be in search mode. In this example, search mode may be characterized by the presence of a query suggestion region 518D.

Figure 5B:
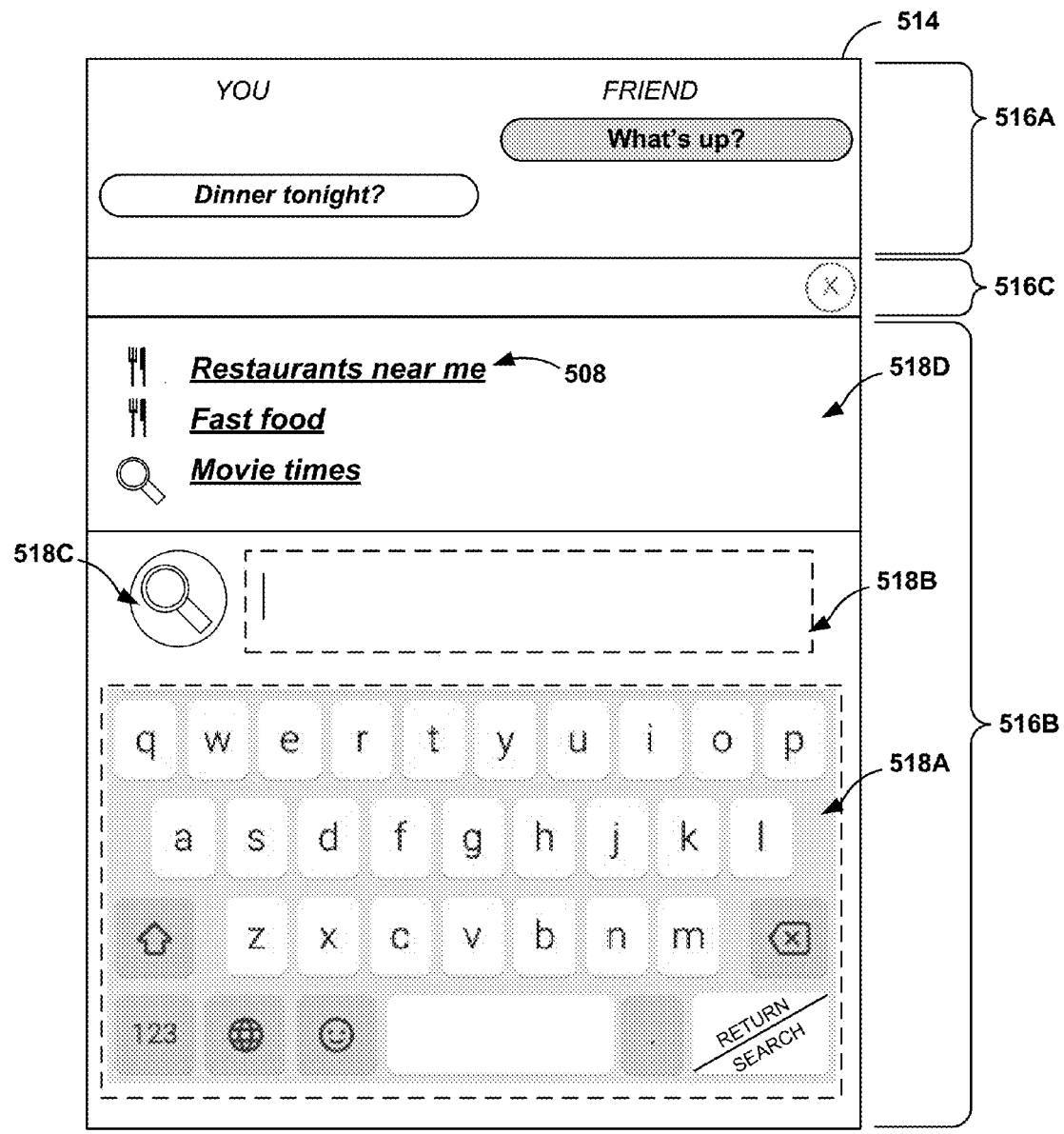

In the example of FIG. 5B, computing device 210 may change the input focus to the suggestion region 518B. This change in input focus may be signified by the cursor shown within the suggestion region 518B, and the absence of a cursor shown within the edit region 516C. In the example shown in FIG. 5B, computing device 210 causes the query suggestion region 518D to be displayed above the suggestion region 518B, and below the edit region 516C. This arrangement creates some visual distance between the suggestion region 518B and edit region 516C. This visual distance may tend to reduce user confusion in situations where both the suggestion region 518B and the edit region 516C are each user interface components that could potentially have input focus at various times.

In other examples, computing device 210 could position the query suggestion region 518D elsewhere within the graphical keyboard 516B. In still further examples, the computing device 210 could position the query suggestion region 518D elsewhere within the user interface 514, partially or entirely outside the graphical keyboard 516B.

The query suggestion region 518D in some examples may include suggested search queries or other information, each of which may represent selectable search queries that could be initiated by computing device 210. In some examples, such as when the user has not entered any text in edit region 516C or suggestion region 518B, there may be no suggested queries to be displayed. In other examples when the user has not entered any text in edit region 516C or suggestion region 518B, computing device 210 may output for display within the query suggestion region 518D suggested queries that include historical queries (previous searches performed by the device 210). In still other examples when the user has not entered any text in edit region 516C or suggestion region 518B, computing device 210 may output for display within the query suggestion region 518D suggested queries that may be of interest to the user based on the user's current activity, application, context, location, situation, or other information. Query suggestions in region 518D may also be generated based, as least in part, on the contents of elements of region 516A, such as content from a conversation "Dinner tonight?" (or similar content and context from different user interfaces that may populate the region of 516A). As shown in FIG. 5B, computing device 210 has included suggested query "Restaurants near me" in the query suggestion region 518D. This suggested query may be based at least in part on the subject of the chat shown in output region 516A. The other suggested queries, "Fast food" and "Movie times" may also be based to some extent on the subject of the chat shown in output region 516A.

Figure 5C:
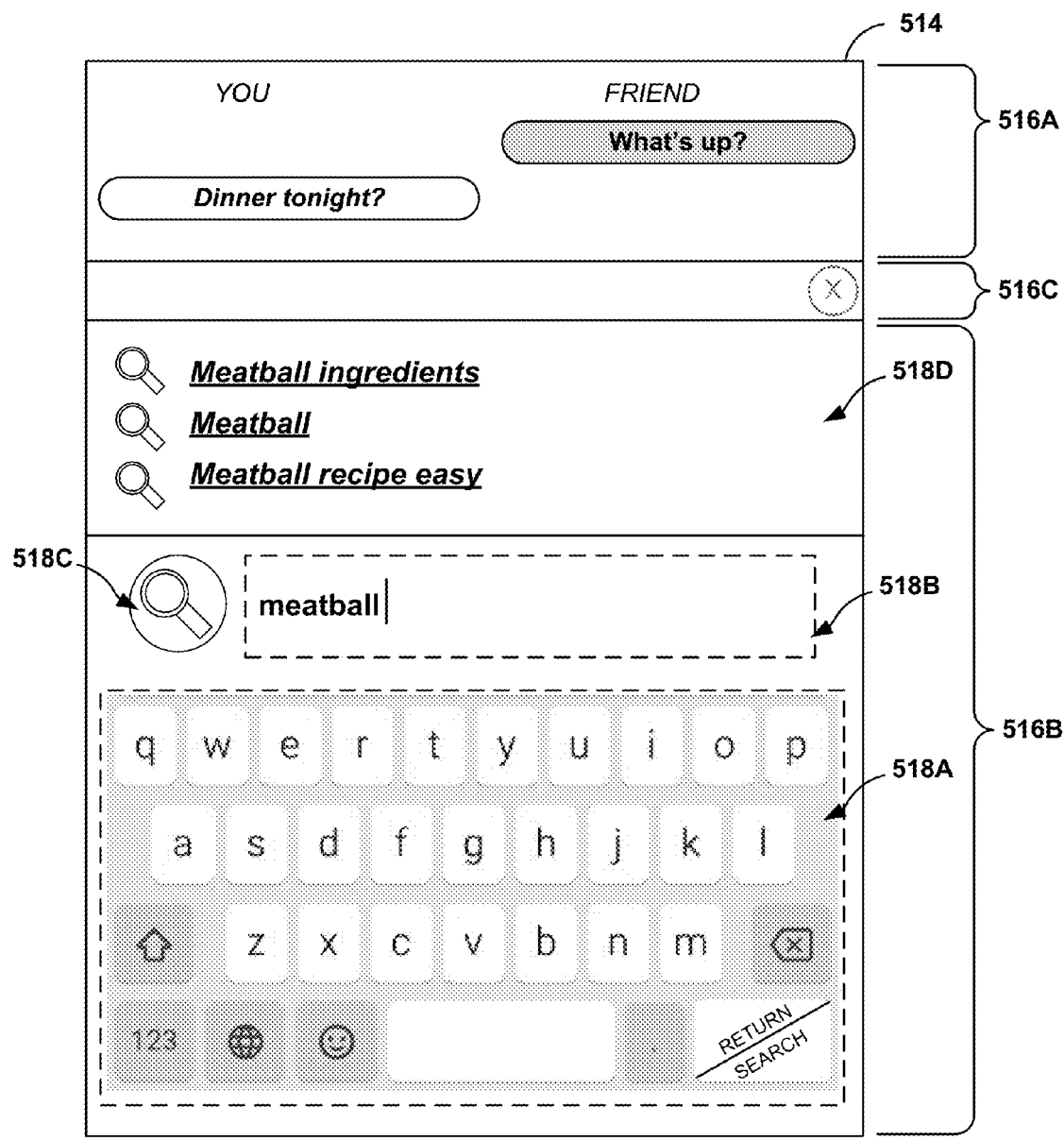

With reference to FIG. 5C, keyboard module 222 of computing device 210 may receive indications of taps or gestures at keys 518A and determine, based on the user input, text that computing device 210 formats and displays within suggestion region 518B. For example, as shown in FIG. 5C, the computing device 210 may cause the text "meatball" to be displayed within suggestion region 518B. Keyboard module 222 of computing device 210 may also, in response to the user input, generate suggested queries that computing device 210 formats and displays within query suggestion region 518D, as shown in FIG. 5C. The suggested queries shown in query suggestion region 518D in FIG. 5C may be at least partially based on, and may be appropriate suggested queries for, the "meatball" text shown in the suggestion region 518B.

Figure 5D:
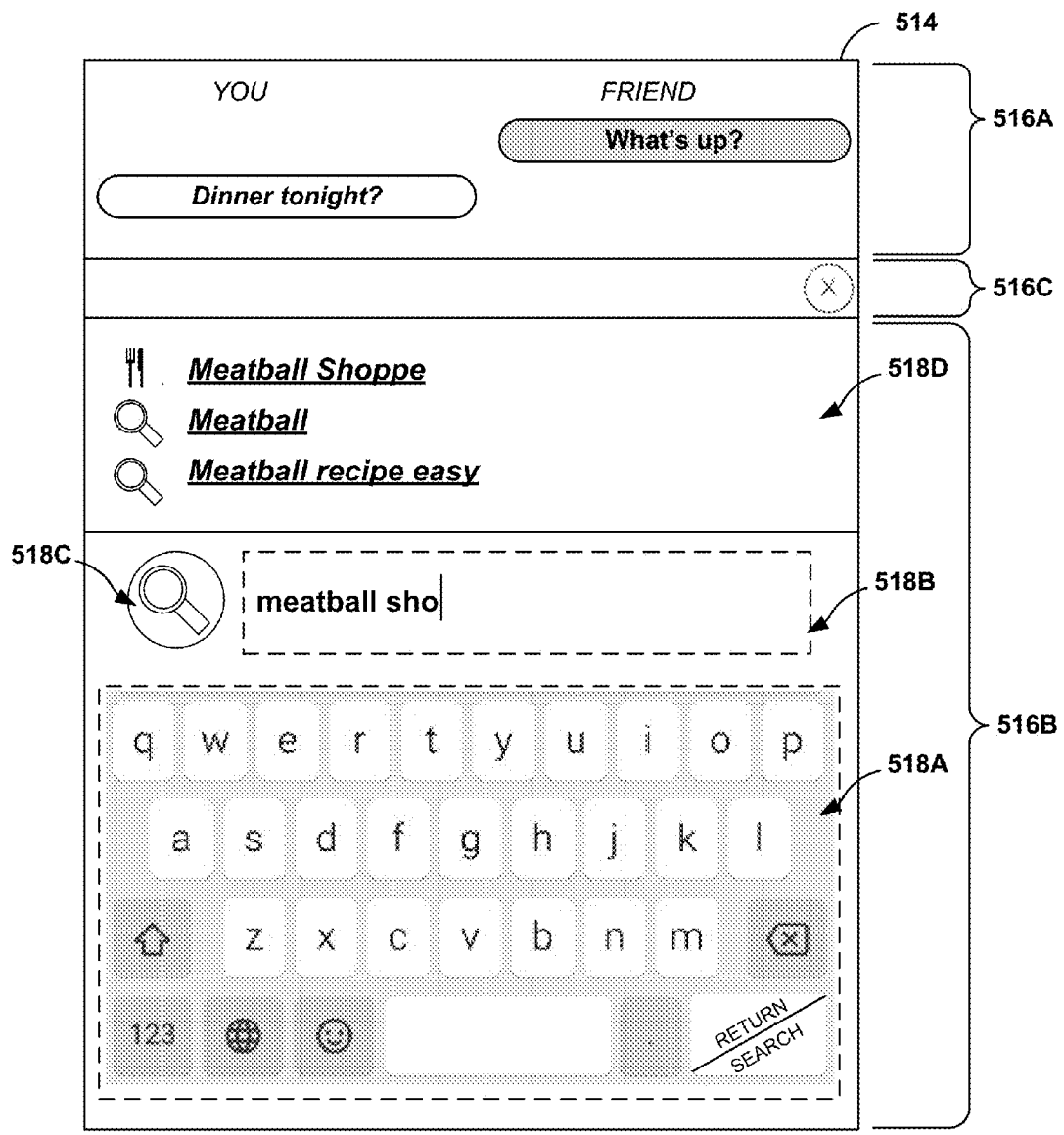

With reference to FIG. 5D, keyboard module 222 of computing device 210 may continue to receive additional indications of taps or gestures at keys 518A and may continue to determine, based on the additional user input, additional text that computing device 210 formats and displays within suggestion region 518B. For example, as shown in FIG. 5D, the computing device 210 may cause the text "meatball sho" to be displayed within suggestion region 518B. Also in response to the additional user input, keyboard module 222 of computing device 210 may generate updated suggested queries that computing device 210 formats and displays within query suggestion region 518D, as shown in FIG. 5D. The suggested queries shown in query suggestion region 518D in FIG. 5D may be at least partially based on, and may be appropriate suggested queries for, the "meatball sho" text shown in the suggestion region 518B.

In some examples, a suggested query that is considered more relevant than other suggested queries may be displayed at the top of the query suggestion region 518D. For example, computing device 210 may execute a model that assigns a score or probability to each of the suggested queries based on text input and contextual information. Computing device 210 may rank the queries based on the assigned scores and probabilities. Computing device 210 may display the highest scoring or highest probability queries near the top of suggestion region 518D and the lower scoring or lower probability queries near the bottom. In other examples, the queries shown in query suggestion region 518D may be listed in descending order of perceived relevance. Other arrangements could be used. In some examples, the determination of relevance of each suggested query may be made, at least partially, by the computing device 210, but in other examples, this determination may be made elsewhere or by another device or other devices, such as by a search engine or other service.

Figure 5E:
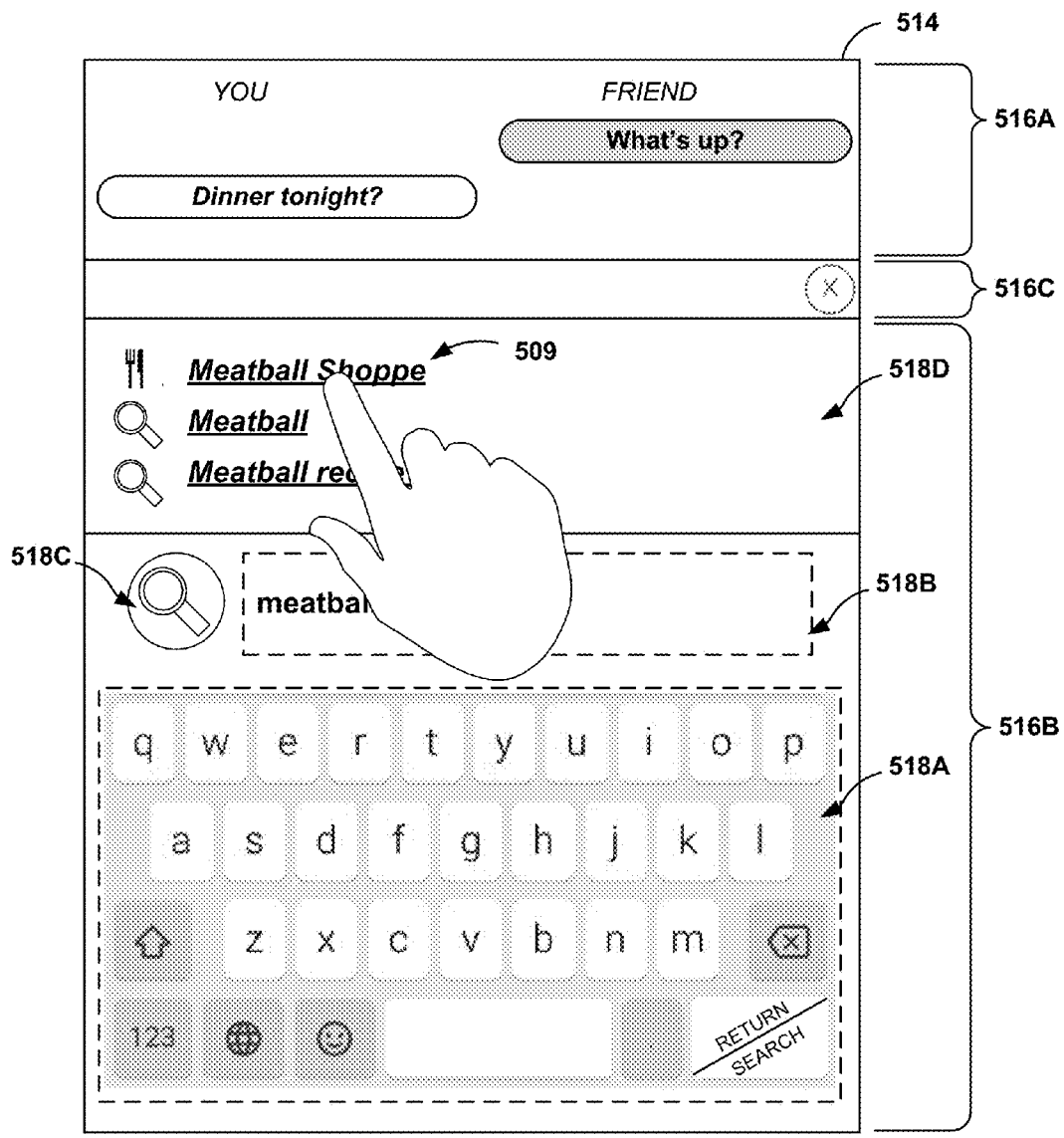

Referring now to FIG. 5E, computing device 210 may receive an indication of input selecting a suggested search query, and responsive to receiving the indication of input, computing device 210 may execute, based on the suggested query, a search for information. For example, as shown in FIG. 5E, keyboard module 222 may receive an indication of user input detected at a location at which suggested search query 509 is displayed within query suggestion region 518D. Responsive to the indication of user input, the computing device 210 may perform a search corresponding to the "Meatball Shoppe" suggested search query 509, and may also update the user interface 514 to indicate that a search is being performed. When search results are available, the computing device 210 may update the user interface 514 to that shown in FIG. 5F.

Figure 5F:
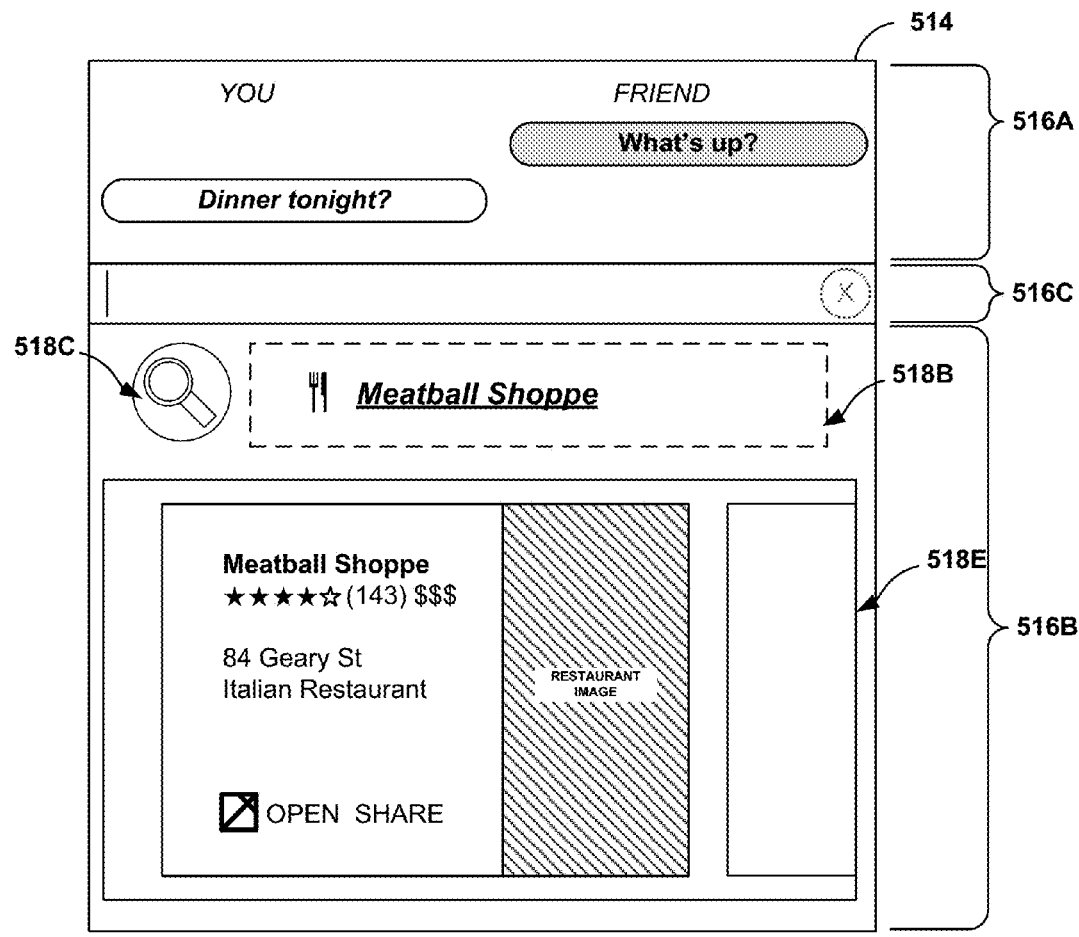

In FIG. 5F, the search results 518E are shown within the graphical keyboard 516B, and in this example, search results 518E are shown below the suggestion region 518B, substantially replacing the graphical keys 518A previously shown in FIG. 5E. The search results 518E may be presented in card-based form. The query suggestion region 518D has been removed from the user interface 514 in the example of FIG. 5F. In other examples, the search results could be shown in other formats, and in other locations within the graphical keyboard 516B. In still other examples, search results may be shown partially or entirely outside the graphical keyboard 516B. In yet further examples, the search result information could also be provided partially or exclusively as audio information, which may enable the user to listen to at least some of the search result information.

In the example of FIG. 5F, the computing device 210 continues to display both the search element 518C and the suggestion region 518B in the user interface 514 along with, and above, the search results 518E. In other examples, computing device 210 could remove either or both of these elements from the user interface 514, or the computing device 210 could display these elements at other locations within the user interface 514. In the example of FIG. 5F, computing device 210 returns the input focus to the edit region 516C. However, individual cards from results 518E may themselves be links such that a user input or gesture indicating selection thereof may link to the website indicated by the card. Furthermore, a card from results 518E may be "dragged" (such as by a user touching the PSD at the location of the card) and, without lifting the touching finger, move the finger to the output region 516A. This may have the effect of copying the card into the context of the output region 516A, such as adding it as a sendable and actionable (i.e., including a selectable link) element of a communication in a chat application. It should also be noted that cards in results 518E may include controls, such that a user may by input or gesture invoke selected actions with respect to the cards or card content, such as copy, open, send, share, map, call, message, purchase, make reservation, and so forth. These controls may be specific to individual search results and cards (i.e., not all cards in results 518E need provide the same controls).

Figure 6A:
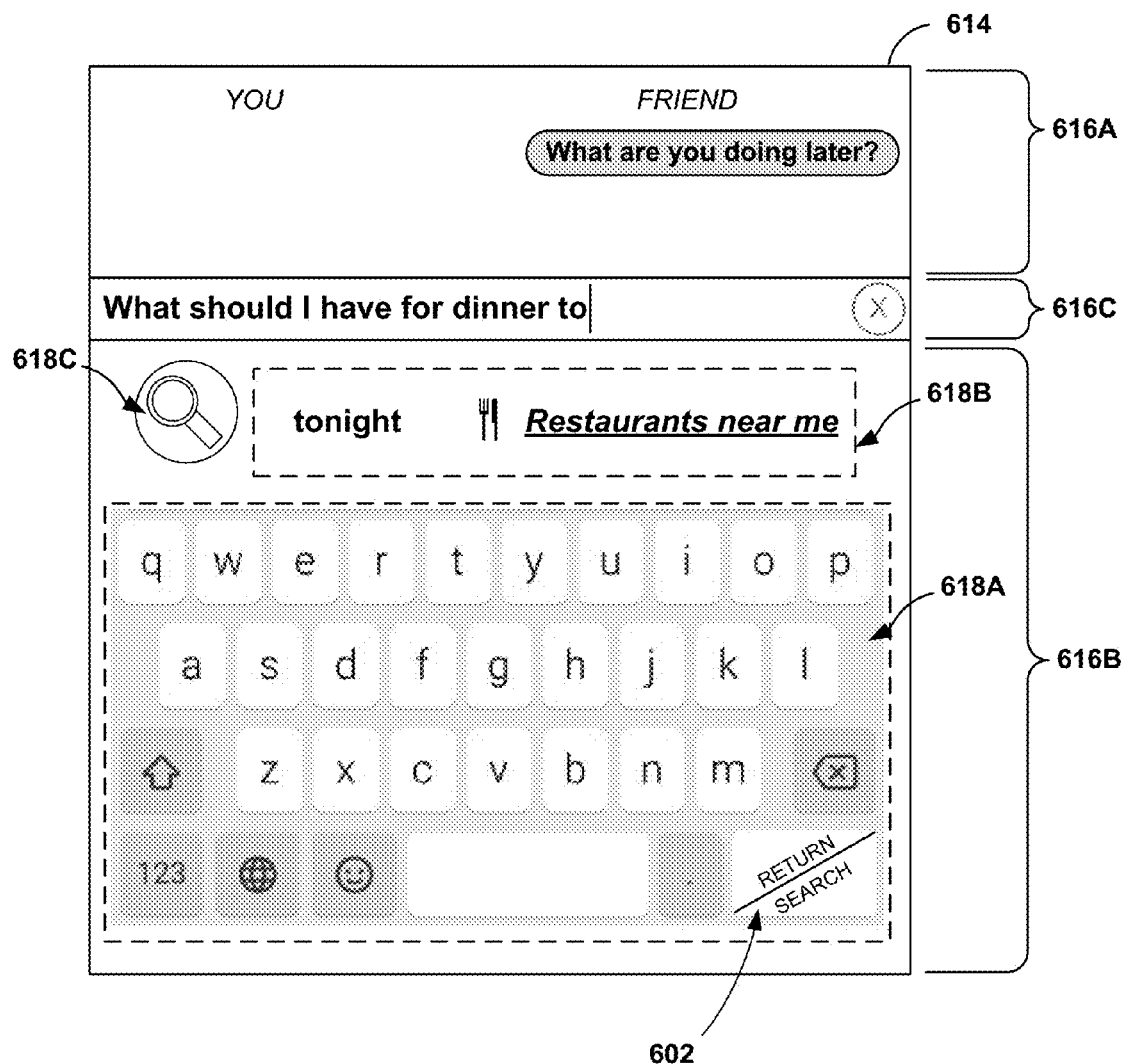
FIGS. 6A-6C are conceptual diagrams illustrating example graphical user interfaces of an example computing device that is configured to present a graphical keyboard with integrated search features, in accordance with one or more aspects of the present disclosure.
Figure 6B:
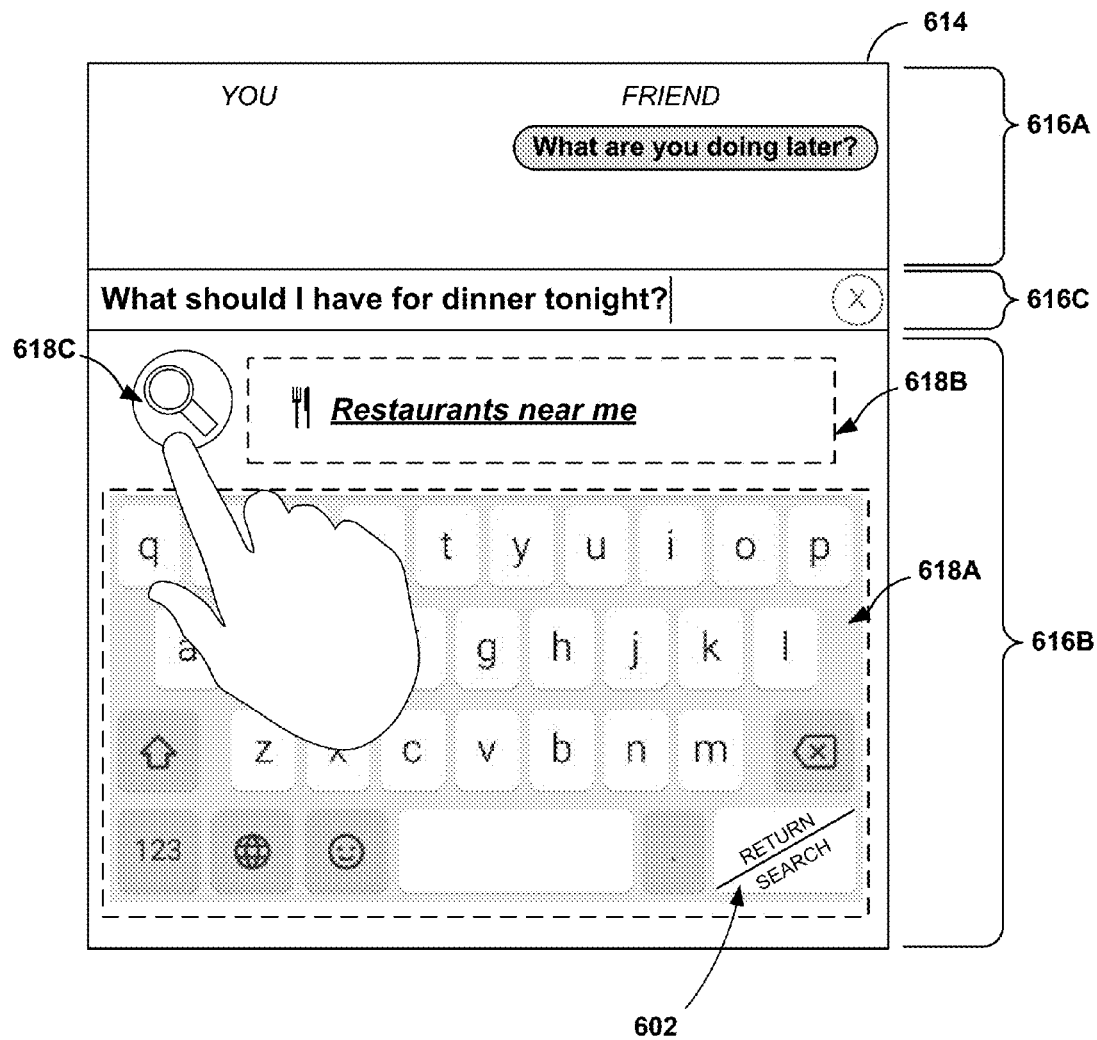
Figure 6C:
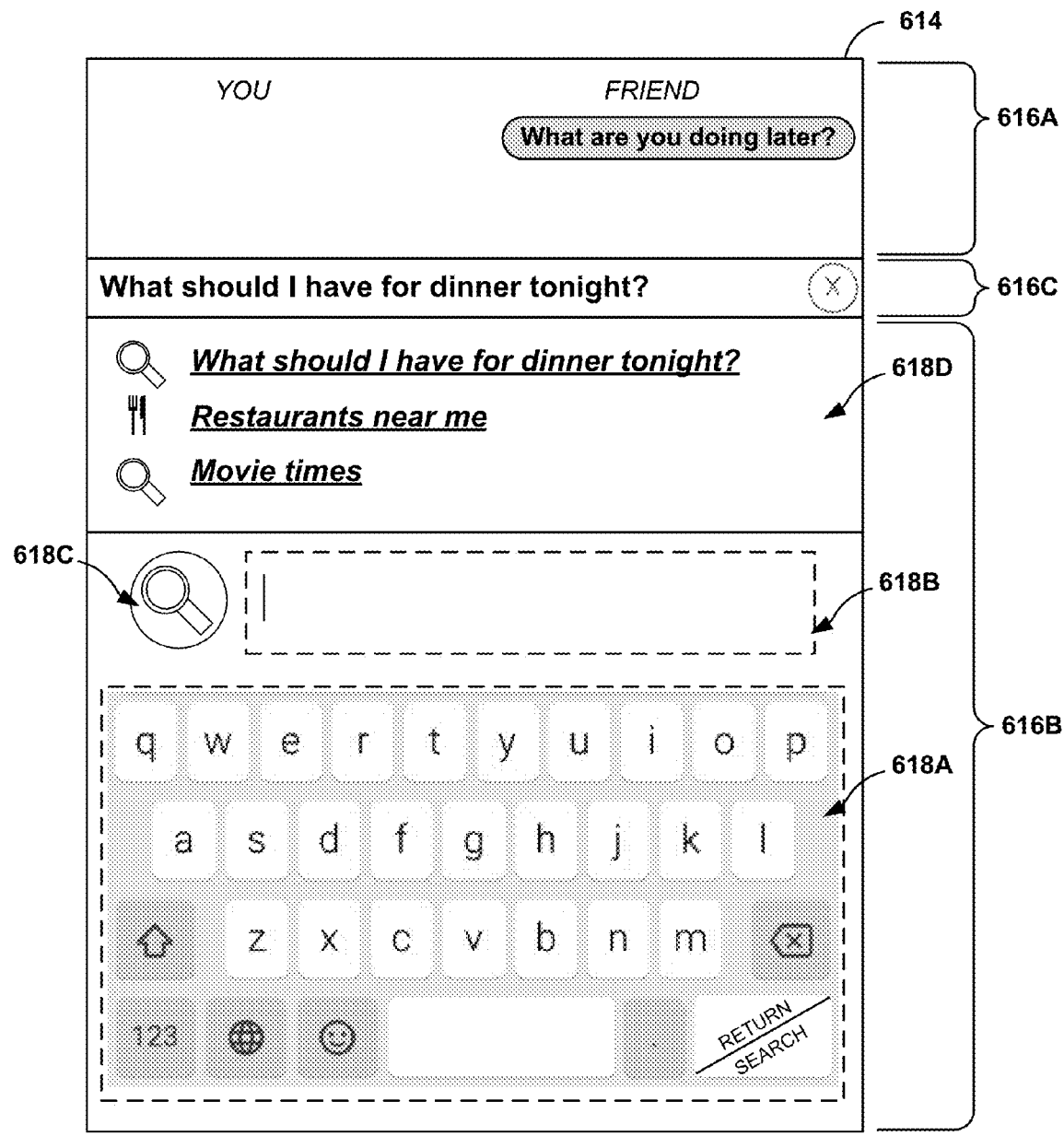

FIGS. 6A-6C are conceptual diagrams illustrating example graphical user interfaces of an example computing device that is configured to present a graphical keyboard in accordance with one or more aspects of the present disclosure. FIGS. 6A-6C illustrate example user interfaces 614; many other examples of graphical user interfaces may be used or presented in other instances or examples. Each of the user interfaces 614 may correspond to a graphical user interface output by computing devices 110, 210, or 310 from FIGS. 1-3. For purposes of illustration, FIGS. 6A-6C are described below within the context of computing device 210 of FIG. 2.

As illustrated in the examples of FIGS. 6A through 6C, each example user interface 614 includes output region 616A, edit region 616C, and graphical keyboard 616B. Output region 616A and edit region 616C may both be associated with the user interface of an application or service executing on or accessible from computing device 210, such as a chat application described in connection with FIGS. 4A-4D and FIGS. 5A-5F. Included within the graphical keyboard 616B are graphical keys 618A, a suggestion region 618B, and a search element 618C.

In FIG. 6A, keyboard module 222 of computing device 210 may receive indications of taps or gestures at keys 618A and determine, based on the user input, a text string that computing device 210 formats and displays within edit region 616C. For example, as shown in FIG. 6A, the computing device 210 may cause the text string "What should I have for dinner to" to be displayed within edit region 616C. The computing device 210 may, in some examples, format and display within suggestion region 618B one or more suggested words, such as the suggested word "tonight" shown in suggestion region 618B. Keyboard module 222 of computing device 210 may also, in response to the user input, generate suggested queries that computing device 210 may format and display within suggestion region 618B, such as the "Restaurants near me" suggested query shown in FIG. 6A. Any suggested queries shown in query suggestion region 618B in FIG. 6A may be based on, and may be appropriate suggested queries for, the text shown in the edit region 616C.

Referring now to FIG. 6B, keyboard module 222 of computing device 210 may continue to receive additional indications of taps or gestures at keys 618A and determine, based on the user input, text that computing device 210 formats and displays within edit region 616C. The text displayed in edit region 616C may be a continuation of the partially-composed text message previously displayed in FIG. 6A. In accordance with the way that some chat applications operate, in some examples the computing device 210 does not transmit this text message to the other person's computing device at the point shown in FIG. 6B, and does not do so until the computing device 210 detects an indication of input selecting the key 602 (or in other examples, a "send" key).

In the example of FIG. 6B, before the computing device 210 receives an indication of input selecting key 602, the computing device 210 receives an indication of input selecting search element 618C. In this situation, the user may select the search element 618C before selecting the key 602 for a number of possible reasons. For example, the user may have intended the text shown in edit region 616C to be a search query, rather than a text message, but may have mistakenly entered the text in the edit region 616C, rather than first selecting the search element 618C and entering the text in suggestion region 618B. Alternatively, the user may have originally intended the text in edit region 616C to be a text message, but may have changed his or her mind and decided to perform a search instead of (or in addition to) submitting the text as a chat message. There may be alternative explanations.

Referring now to FIG. 6C, the computing device 210, in response to the indication of input selecting search element 618C, may output, for display, query suggestion region 618D. In the example shown, the computing device 210 has also changed the input focus to the suggestion region 618B, and cleared the suggestion region 618B of any text or suggested queries. The computing device 210 formats and displays within query suggestion region 618D a number of suggested queries. In the example of FIG. 6C, computing device 210 generates the uppermost displayed suggested query based on the text in the edit region 616C, and this suggested query contains the exact same text as that in the edit region 616C. In some examples, the text may be used as a suggested query in the query suggestion region 618D after the computing device 210 makes any stylistic or spelling corrections or other modifications. The computing device also includes within the query suggestion region 618D other suggested queries which may be relevant or pertinent to the text in edit region 616C and possibly the information in the output region 616A. In accordance with one or more aspects of the present disclosure, the graphical keyboard 616B may, in some examples, be considered to be in search mode in FIG. 6C.

In another example that may differ in some respects from examples previously described with respect to FIGS. 6A-6C, a string of characters that has already been transmitted as a text message by the computing device 210 may still be available as a suggested search query. For example, with reference to FIG. 6B, computing device 210 may, before detecting that the user has selected the search element 618C, transmit the text in edit region 616C in FIG. 6B as a chat message in response to user input (e.g., a selection of key 602). The computing device may then later detect an indication of input selecting the search element 618C, and in response to detecting this input, the computing device 210 may cause a query suggestion region to be displayed within the user interface 614. In such an example, the computing device 210 may display suggested queries within the query suggestion region that are similar to or the same as those shown in query suggestion region 618D in FIG. 6C. These suggested queries may include a suggested search query that is created with the exact text of the most recent chat message from the chat application, enabling the same text to be used as a search query. The most recent and earlier text messages exchanged in the chat application may also provide enough context to generate useful other suggested search queries.

Figure 7:
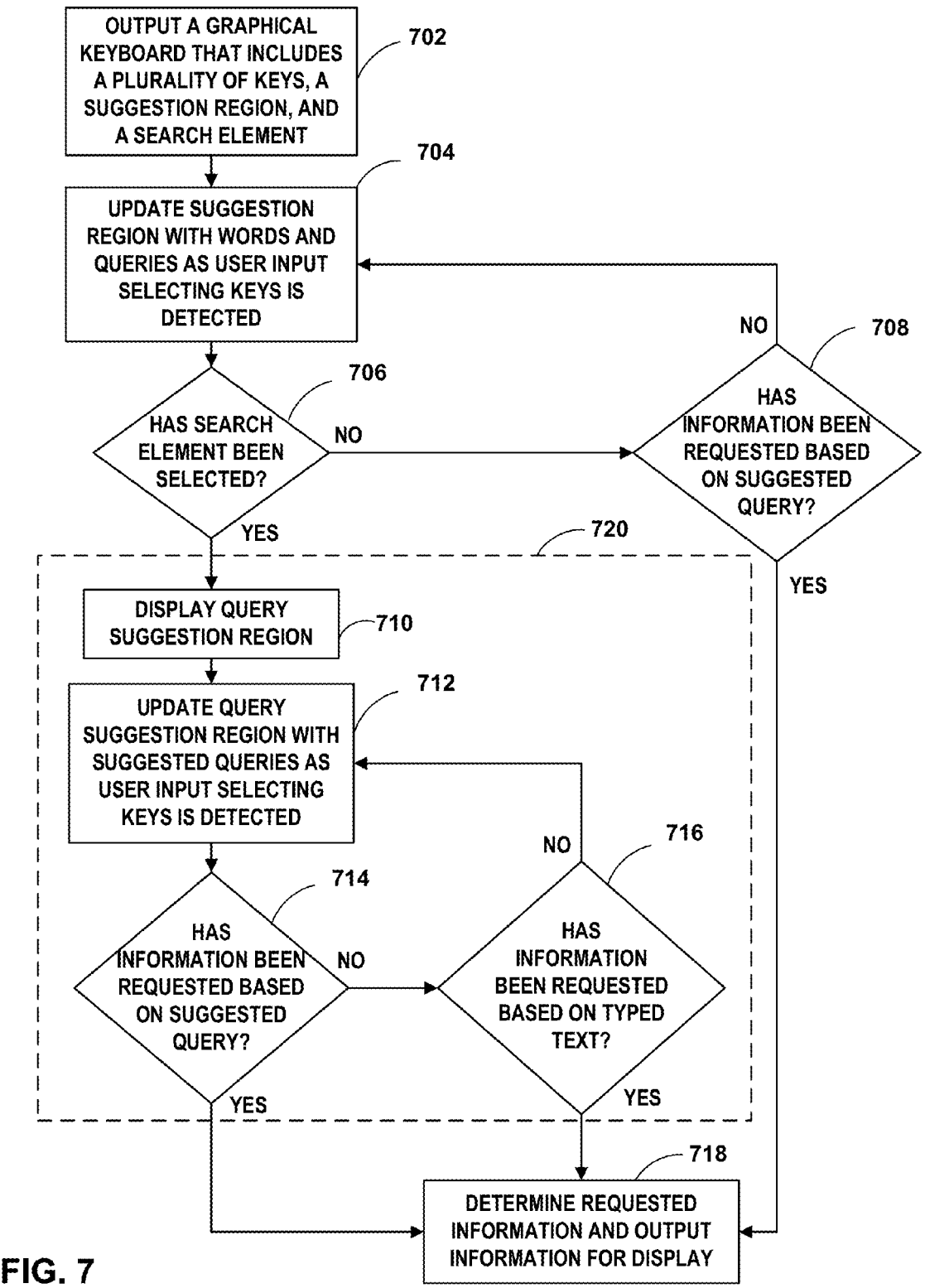
FIG. 7 is a flowchart illustrating example operations of a computing device that is configured to present a graphical keyboard with integrated search features, in accordance with one or more aspects of the present disclosure.

FIG. 7 is a flowchart illustrating an example operation of a computing device that is configured to present a graphical keyboard in accordance with one or more aspects of the present disclosure. The process of FIG. 7 may be performed by one or more processors of a computing device, such as computing devices 110, 210, or 310 as illustrated in FIGS. 1-3. For purposes of illustration, FIG. 7 is described below within the context of computing device 110 of FIG. 1.

In the example of FIG. 7, a computing device 110 may output, for display, a graphical user interface. This graphical user interface may include a user interface for one or more applications. The graphical user interface may also include a graphical keyboard (702). In some examples, the application may be a chat application, such as that described in connection with FIG. 1, but other applications, such as a fitness, calendar, personal assistant, prediction, map, navigation, tracking, social media, email, or game application (or many others) could also or alternatively be used with a graphical keyboard in accordance with one or more aspects of the present disclosure.

The graphical keyboard may include a plurality of graphical keys, a suggestion region, and a search element, such as was described, for example, in connection with FIG. 1. When the graphical keyboard includes a search element, such as the search element 118C shown in FIG. 1, computing device 110 may interpret input associated with a user's selection of the search element as a request to transition the graphical keyboard into search mode in accordance with one or more aspects of the present disclosure. The graphical keyboard may further include a query suggestion region, such as the query suggestion region 118D shown in FIG. 1. The query suggestion region 118D may be may be selectively displayed within the graphical keyboard in accordance with one or more aspects of the present disclosure.

The computing device 110 may determine, based on the user's interaction with one or more of the graphical keys within the graphical keyboard, one or more suggested words and suggested search queries. For example, UI module 120 may detect one or more inputs at mapped locations on PSD 112 and may generate one or more touch events corresponding to the input from the user. Keyboard module 122 may include a spatial module which may select, based on the touch events, one or more keys corresponding to the user input. Keyboard module 122 may also include a language module, which may identify one or more words within a lexicon that may be used to identify suggested words. The keyboard module 122 may also use this information to generate suggested queries, but keyboard module 122 may also use additional information. For example, keyboard module 122 may also base the suggested queries on the user's current activity, context, location, or situation in accordance with one or more aspects of the present disclosure. Computing device 110 may update the suggested words and/or suggested queries as the computing device 110 detects input corresponding to selections of graphical keys within the graphical keyboard (704).

The computing device 110 may determine, based on the user's input or interaction with the computing device 110, whether the user seeks to operate the graphical keyboard in search mode. In some examples, computing device 110 may determine that the user seeks to operate the graphical keyboard in search mode in response to detecting a selection of a search element displayed within the graphical keyboard (YES path from 706). Search mode may generally correspond to the sub-process 720 shown in FIG. 7, but in other examples, search mode in accordance with one or more aspects of the present disclosure may involve more or less or different operations.

The computing device 110 may also determine whether it has received input selecting one of the suggested queries, if any, that may be displayed within the suggestion region (708). If the computing device does not detect input selecting a suggested query, the computing device 110 continues to update the suggested queries in the suggestion region in response to user input (704). If the computing device 110 does detect input selecting a suggested query in the suggestion region, the computing device 110 obtains information associated with the selected suggested query. In some examples, the suggested queries are selectable links, and in response to the computing device 110 detecting input selecting a suggested query, the computing device determines information obtained by invoking the selectable link.

Obtaining information corresponding to a selected suggested query may in some examples involve invoking a search operation using the content of the selected suggested query as a search query. In other examples, obtaining this information might not require a search operation. Situations where a search operation might not be performed include when the selected suggested query points directly to an item of information, or points to an item of information (e.g., a document, or a contact) on the computing device 110. When the computing device 110 determines information obtained by invoking the selectable link associated with the selected suggested query, the computing device 110 may output the obtained information for display (YES path from 708).

If the computing device 110 detects input selecting the search element (YES path from 706), the computing device 110 may output, for display, a query suggestion region within the user interface. In some examples, the query suggestion region is displayed within the graphical keyboard, as shown in FIG. 1. Computing device 110 may format and display suggested search queries that may be updated as the computing device 110 continues to detect user input (712).

If the computing device 110 detects input selecting one of the suggested queries (YES path from 714), the computing device 110 may perform a search corresponding to the selected suggested query, and output, for display, the requested information (718). Alternatively, if the computing device 110 detects input from the user requesting a search based on a string of text characters determined from user input (YES path from 716), then the computing device 110 may perform a search corresponding to the string of text characters, and output, for display, the requested information (718). The computing device 110 may continue to monitor user input and update the query suggestion region with suggested queries (NO path from 716).

In some examples, the operations shown in FIG. 7 may be performed in a different order or presented in a different sequence, but still be in accordance with one or more aspects of the present disclosure. As one example, the order of operations 706 and 708 may be reversed or done in parallel in FIG. 7 (which may involve modifications to other operations, or the order of other operations) while still remaining in accordance with one or more aspects of the present disclosure. As another example, the order of operations 714 and 716 may switched or done in parallel in FIG. 7 (which may involve modifications to other operations, or the order of other operations) while still remaining in accordance with one or more aspects of the present disclosure. Further, a process in accordance with one or more aspects of the present disclosure may be implemented with less than the operations shown in FIG. 7, and in other examples, a process in accordance with one or more aspects of the present disclosure may be implemented with more or different than the operations shown in FIG. 7.

Figure 8:
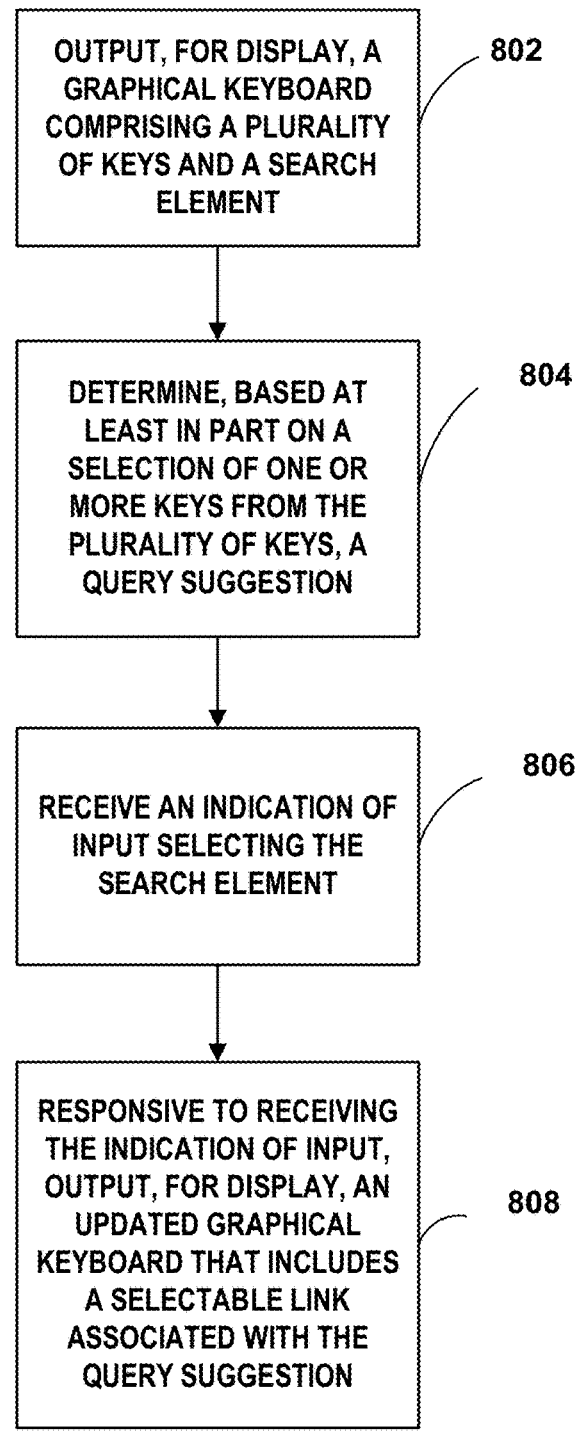
FIG. 8 is a flowchart illustrating example operations of a computing device that is configured to present a graphical keyboard with integrated search features, in accordance with one or more aspects of the present disclosure.

FIG. 8 is a flowchart illustrating an example operation of a computing device that is configured to present a graphical keyboard in accordance with one or more aspects of the present disclosure. The process of FIG. 8 may be performed by one or more processors of a computing device, such as computing devices 110, 210, or 310 as illustrated in FIGS. 1-3. For purposes of illustration, FIG. 8 is described below within the context of computing device 110 of FIG. 1.

In operation, computing device may output a graphical keyboard for display (802). For example, a chat application executing at computing device 110 may invoke keyboard module 122 (e.g., a standalone application or function of computing device 110 that is separate from the chat application) to present graphical keyboard 116B at PSD 112. The graphical keyboard 116B may comprise a plurality of keys and a search element.

Computing device 110 may determine, based at least in part on a selection of one or more keys from the plurality of keys, a query suggestion (804). For example, keyboard module 122 may receive information about touch inputs detected at locations of PSD 112 at which graphical keys 118A of graphical keyboard 116B are being displayed. Keyboard module 122 may determine a suggested query based at least in part on this information.

Computing device 110 may receive an indication of input selecting the search element (806). For example, keyboard module 122 may receive information about a touch input detected at a location of PSD 112 at which search element 118C is being displayed.

Computing device 110 may, in response to receiving the indication of input, output for display an updated graphical keyboard that includes a selectable link associated with the query suggestion. For example, keyboard module 122 may format and display a selectable link such as suggested query 406 shown in FIG. 4B or suggested query 508 in FIG. 5B.

The following numbered clauses may illustrate one or more aspects of the disclosure:

Clause 1. A method comprising: outputting, by a mobile computing device, for display, a graphical keyboard comprising a plurality of keys and a search element; determining, based at least in part on a selection of one or more keys from the plurality of keys, a query suggestion; receiving, by the mobile computing device, an indication of input selecting the search element; and responsive to receiving the indication of input, outputting, by the mobile computing device, for display, an updated graphical keyboard that includes a selectable link associated with the query suggestion.

Clause 2. The method of clause 1, wherein the indication of input is a first indication of input, the method further comprising: receiving, by the mobile computing device, a second indication of input invoking the selectable link; responsive to receiving the second indication of input, determining, based on the second indication of input, information obtained by invoking the selectable link; and outputting, by the mobile computing device, for display, the information obtained by invoking the selectable link.

Clause 3. The method of clause 2, wherein outputting the information obtained by invoking the selectable link includes outputting, within the updated graphical keyboard, the information obtained by invoking the selectable link.

Clause 4. The method of clause 3, wherein outputting the updated graphical keyboard includes outputting the updated graphical keyboard further including the plurality of keys, and wherein outputting the information obtained by invoking the selectable link includes outputting the information by substantially replacing the plurality of keys with the information.

Clause 5. The method of clause 4, wherein outputting the information obtained by invoking the selectable link includes outputting the information in a scrollable, card-based format.

Clause 6. The method of clause 2-5, wherein determining information obtained by invoking the selectable link includes determining search result information by performing a search operation using content included in the selectable link as a search query.

Clause 7. The method of clause 1-6, wherein outputting the updated graphical keyboard includes outputting the updated graphical keyboard further including the plurality of keys, and with the selectable link positioned above the plurality of keys.

Clause 8. The method of clause 1-7, wherein the one or more keys is a first set of keys, wherein the indication of input is a first indication of input, wherein the selectable link is a first selectable link, and wherein outputting the updated graphical keyboard includes outputting the updated graphical keyboard further including the plurality of keys, the method further comprising: determining, based at least in part on a selection of a second set of keys from the plurality of keys, an updated query suggestion; responsive to determining the updated query suggestion, outputting, by the mobile computing device, for display, a further updated graphical keyboard that includes a second selectable link associated with the updated query suggestion; receiving, by the mobile computing device, a second indication of input invoking the second selectable link; responsive to receiving the second indication of input, determining, based on the second indication of input, search result information; and outputting, by the mobile computing device, for display, the search result information.

Clause 9. The method of clause 1-8, wherein outputting the updated graphical keyboard includes outputting the updated graphical keyboard as part of an application graphical user interface, and wherein the application graphical user interface includes an edit region that is positioned above the selectable link associated with the query suggestion.

Clause 10. The method of clause 1-9, wherein determining the query suggestion includes determining a plurality of query suggestions including a historical query suggestion based on a prior search, and wherein outputting the updated graphical keyboard includes outputting the updated graphical keyboard further including a selectable link associated with the historical query suggestion.

Clause 11. A mobile device comprising: a presence-sensitive display component; at least one processor; and a memory that stores instructions that when executed cause the at least one processor to: output, for display, a graphical keyboard comprising a plurality of keys and a search element; determine, based at least in part on a selection of one or more keys from the plurality of keys, a query suggestion; receive an indication of input selecting the search element; and responsive to receiving the indication of input, output, for display, an updated graphical keyboard that includes a selectable link associated with the query suggestion.

Clause 12. The mobile device of clause 11, wherein the indication of input is a first indication of input, and wherein the instructions, when executed, further cause the at least one processor to: receive a second indication of input invoking the selectable link; responsive to receiving the second indication of input, determine, based on the second indication of input, information obtained by invoking the selectable link; and output, for display, the information obtained by invoking the selectable link.

Clause 13. The mobile device of clause 12, wherein the instructions, when executed, further cause the at least one processor to output the information obtained by invoking the selectable link by at least outputting, within the updated graphical keyboard, the information obtained by invoking the selectable link.

Clause 14. The mobile device of clause 13, wherein the updated graphical keyboard is output for display further including the plurality of keys, and wherein the information obtained by invoking the selectable link is output by substantially replacing the plurality of keys with the information obtained by invoking the selectable link.

Clause 15. The mobile device of clause 11-14, wherein the one or more keys is a first set of keys, wherein the indication of input is a first indication of input, and wherein the selectable link is a first selectable link, wherein the updated graphical keyboard is output for display further including the plurality of keys, and wherein the instructions, when executed, further cause the at least one processor to: determine, based at least in part on a selection of a second set of keys from the plurality of keys, an updated query suggestion; responsive to determining the updated query suggestion, output, for display, a further updated graphical keyboard that includes a second selectable link associated with the updated query suggestion; receive a second indication of input invoking the second selectable link; responsive to receiving the second indication of input, determine, based on the second indication of input, search result information; and output, for display, the search result information.

Clause 16. A computer-readable storage medium comprising instructions that, when executed, cause at least one processor of a computing device to: output, for display, an application graphical user interface comprising an edit region, a plurality of keys, and a search element; determine, based at least in part on a selection of one or more keys from the plurality of keys, a query suggestion; receive an indication of input selecting the search element; and responsive to receiving the indication of input, output, for display, an updated application graphical user interface that includes a selectable link associated with the query suggestion, wherein the selectable link is positioned between the edit region and the plurality of keys.

Clause 17. The computer-readable storage medium 16, wherein the indication of input is a first indication of input, and wherein the instructions, when executed, further cause the at least one processor to: receive a second indication of input invoking the selectable link; responsive to receiving the second indication of input, determine, based on the second indication of input, information obtained by invoking the selectable link; and output, for display, the information obtained by invoking the selectable link.

Clause 18. The computer-readable storage medium of clause 17, wherein the instructions, when executed, further cause the at least one processor to output the information obtained by invoking the selectable link by at least outputting, below the edit region, the information obtained by invoking the selectable link.

Clause 19. The computer-readable storage medium of clause 18, wherein the updated graphical user interface is output for display further including the plurality of keys, and wherein the information obtained by invoking the selectable link is output by substantially replacing the plurality of keys with the information obtained by invoking the selectable link.

Clause 20. The computer-readable storage medium of clause 16-19, wherein the one or more keys is a first set of keys, wherein the indication of input is a first indication of input, and wherein the selectable link is a first selectable link, wherein the updated graphical user interface is output for display further including the plurality of keys, and wherein the instructions, when executed, further cause the at least one processor to: determine, based at least in part on a selection of a second set of keys from the plurality of keys, an updated query suggestion; responsive to determining the updated query suggestion, output, for display, a further updated graphical user interface that includes a second selectable link associated with the updated query suggestion; receive a second indication of input invoking the second selectable link; responsive to receiving the second indication of input, determine, based on the second indication of input, search result information; and output, for display, the search result information.

Clause 21. A system comprising means for performing any of the methods of clauses 1-10.

Clause 22. A computing device comprising means for performing any of the methods of clauses 1-10.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples may be within the scope of the following claims.

What is claimed is:

1. A method comprising:
outputting, by a keyboard application executing at a mobile computing device, for display, a graphical keyboard comprising a plurality of keys and a search element;
determining, based at least in part on a selection of one or more keys from the plurality of keys, a query suggestion;
receiving, by the keyboard application, a first indication of input selecting the search element;
responsive to receiving the first indication of input, outputting, by the keyboard application, for display, an updated graphical keyboard that includes the plurality of keys and a selectable link associated with the query suggestion, wherein the selectable link is positioned above the plurality of keys;
receiving, by the keyboard application, a second indication of input invoking the selectable link;
responsible to receiving the second indication of input, determining, based on the second indication of input, information obtained from invoking the selectable link; and
outputting, by the keyboard application, for display, within the updated graphical keyboard and by replacing each letter key from the plurality of keys, the information obtained from invoking the selectable link, wherein the information is output for display in a scrollable, card-based format.

2. The method of claim 1, wherein determining information obtained by invoking the selectable link includes determining search result information by performing a search operation using content included in the selectable link as a search query.

3. The method of claim 1, wherein the one or more keys is a first set of keys, wherein the selectable link is a first selectable link, and wherein outputting the updated graphical keyboard includes outputting the updated graphical keyboard further including the plurality of keys, the method further comprising:
determining, based at least in part on a selection of a second set of keys from the plurality of keys, an updated query suggestion;
responsive to determining the updated query suggestion, outputting, by the keyboard application, for display, a further updated graphical keyboard that includes a second selectable link associated with the updated query suggestion;
receiving, by the keyboard application, a second indication of input invoking the second selectable link;
responsive to receiving the second indication of input, determining, based on the second indication of input, search result information; and
outputting, by the keyboard application, for display, the search result information.

4. The method of claim 1, wherein outputting the updated graphical keyboard includes outputting the updated graphical keyboard as part of an application graphical user interface, and wherein the application graphical user interface includes an edit region that is positioned above the selectable link associated with the query suggestion.

5. The method of claim 1, wherein determining the query suggestion includes determining a plurality of query suggestions including a historical query suggestion based on a prior search, and wherein outputting the updated graphical keyboard includes outputting the updated graphical keyboard further including a selectable link associated with the historical query suggestion.

6. A mobile device comprising:
a presence-sensitive display component;
at least one processor; and
a memory that stores instructions associated with a keyboard application that when executed by the at least one processor cause the keyboard application to:
output, for display, a graphical keyboard comprising a plurality of keys and a search element;
determine, based at least in part on a selection of one or more keys from the plurality of keys, a query suggestion;
receive a first indication of input selecting the search element;
responsive to receiving the first indication of input, output, for display, an updated graphical keyboard that includes the plurality of keys and a selectable link associated with the query suggestion, wherein the selectable link is positioned above the plurality of keys;
receive a second indication of input invoking the selectable link;
responsive to receiving the second indication of input, determine, based on the second indication of input, information obtained from invoking the selectable link; and
output, for display, within the updated graphical keyboard and by replacing each letter key from the plurality of keys, the information obtained from invoking the selectable link, wherein the information is output for display in a scrollable, card-based format.

7. The mobile device of claim 6, wherein the one or more keys is a first set of keys, wherein the indication of input is a first indication of input, and wherein the selectable link is a first selectable link, wherein the updated graphical keyboard is output for display further including the plurality of keys, and wherein the instructions associated with the keyboard application, when executed by the at least one processor, cause the keyboard application to:
determine, based at least in part on a selection of a second set of keys from the plurality of keys, an updated query suggestion;
responsive to determining the updated query suggestion, output, for display, a further updated graphical keyboard that includes a second selectable link associated with the updated query suggestion;
receive a second indication of input invoking the second selectable link;
responsive to receiving the second indication of input, determine, based on the second indication of input, search result information; and
output, for display, the search result information.

8. A computer-readable storage medium comprising instructions associated with a keyboard application, wherein the instructions, when executed by at least one processor of a computing device, cause the keyboard application to:

output, for display, an application graphical user interface comprising an edit region, a plurality of keys, and a search element;

determine, based at least in part on a selection of one or more keys from the plurality of keys, a query suggestion;

receive a first indication of input selecting the search element;

responsive to receiving the first indication of input, output, for display, an updated application graphical user interface that includes the edit region, the plurality of keys, and a selectable link associated with the query suggestion, wherein the selectable link is positioned between the edit region and the plurality of keys;

receive a second indication of input invoking the selectable link;

responsive to receiving the second indication of input, determine, based on the second indication of input, information obtained from invoking the selectable link; and output, for display, within the updated graphical keyboard and by replacing each letter key from the plurality of keys, the information obtained from invoking the selectable link, wherein the information is output for display in a scrollable, card-based format below the edit region.

9. The computer-readable storage medium of claim 8, wherein the one or more keys is a first set of keys, wherein the indication of input is a first indication of input, wherein the selectable link is a first selectable link, and wherein the instructions associated with the keyboard application, when executed by at least one processor of the computing device, cause the keyboard application to:

determine, based at least in part on a selection of a second set of keys from the plurality of keys, an updated query suggestion;

responsive to determining the updated query suggestion, output, for display, a further updated graphical user interface that includes a second selectable link associated with the updated query suggestion;

receive a second indication of input invoking the second selectable link;

responsive to receiving the second indication of input, determine, based on the second indication of input, search result information; and output, for display, the search result information.

10. The mobile device of claim 6, wherein the instructions associated with the keyboard application, when executed by the at least one processor, cause the keyboard application to determine information obtained by invoking the selectable link by at least determining search result information by performing a search operation using content included in the selectable link as a search query.

11. The mobile device of claim 6, wherein the instructions associated with the keyboard application, when executed by the at least one processor, cause the keyboard application to output the updated graphical keyboard by at least outputting the updated graphical keyboard as part of an application graphical user interface, and wherein the application graphical user interface includes an edit region that is positioned above the selectable link associated with the query suggestion.

12. The mobile device of claim 6, wherein the instructions associated with the keyboard application, when executed by the at least one processor, cause the keyboard application to determine the query suggestion by at least determining a plurality of query suggestions including a historical query suggestion based on a prior search, and wherein outputting the updated graphical keyboard includes outputting the updated graphical keyboard further including a selectable link associated with the historical query suggestion.

13. The computer-readable storage medium of claim 8, wherein the instructions associated with the keyboard application, when executed by the at least one processor, cause the keyboard application to determine information obtained by invoking the selectable link by at least determining search result information by performing a search operation using content included in the selectable link as a search query.

14. The computer-readable storage medium of claim 8, wherein the instructions associated with the keyboard application, when executed by the at least one processor, cause the keyboard application to output the updated graphical keyboard by at least outputting the updated graphical keyboard as part of an application graphical user interface, and wherein the application graphical user interface includes an edit region that is positioned above the selectable link associated with the query suggestion.

15. The computer-readable storage medium of claim 8, wherein the instructions associated with the keyboard application, when executed by the at least one processor, cause the keyboard application to determine the query suggestion by at least determining a plurality of query suggestions including a historical query suggestion based on a prior search, and wherein outputting the updated graphical keyboard includes outputting the updated graphical keyboard further including a selectable link associated with the historical query suggestion.

* * * * *